United States Patent
Wujuan et al.

(10) Patent No.: US 8,296,420 B2
(45) Date of Patent: Oct. 23, 2012

(54) METHOD AND APPARATUS FOR CONSTRUCTING A DHT-BASED GLOBAL NAMESPACE

(75) Inventors: Lin Wujuan, Senggang East Way (SG); Shoji Kodama, St Thomas Walk (SG)

(73) Assignee: Hitachi, Ltd., Tokyo (JP)

( * ) Notice: Subject to any disclaimer, the term of this patent is extended or adjusted under 35 U.S.C. 154(b) by 616 days.

(21) Appl. No.: 12/562,430

(22) Filed: Sep. 18, 2009

(65) Prior Publication Data

US 2011/0072126 A1    Mar. 24, 2011

(51) Int. Cl.
*G06F 15/173* (2006.01)
(52) U.S. Cl. .................... 709/224; 709/203; 709/219
(58) Field of Classification Search .............. 709/224
See application file for complete search history.

(56) References Cited

U.S. PATENT DOCUMENTS

| | | | |
|---|---|---|---|
| 7,072,917 B2 * | 7/2006 | Wong et al. | 707/693 |
| 8,108,502 B2 * | 1/2012 | Tabbara et al. | 709/223 |
| 2003/0097454 A1 | 5/2003 | Yamakawa et al. | |
| 2006/0271598 A1 * | 11/2006 | Wong et al. | 707/200 |
| 2008/0130516 A1 * | 6/2008 | You et al. | 370/254 |

OTHER PUBLICATIONS

Stoica et al. "Chord: A Scalable Peer-to-per Lookup Service for Internet Applications." ACM SIGCOMM'01, Aug. 27-31, 2001, San Diego, California, USA. pp. 1-12.*
Zhao et al. "Tapestry: An Infrastructure for Fault-tolerant Wide-area Location and Routing." University of California, Berkeley. Apr. 2001. pp. 1-28.*

* cited by examiner

Primary Examiner — Christopher Biagini
(74) Attorney, Agent, or Firm — Brundidge & Stanger, P.C.

(57) ABSTRACT

A DHT-based global namespace (GNS) is constructed for a network system that includes network attached storage (NAS) devices, including at least one DHT-NAS device (a NAS device having DHT Functionalities) and at least one Existing-NAS device (a NAS device lacking DHT Functionalities). In a DHT Overlay Construction Phase, the DHT-NAS devices construct a DHT overlay. In an Initial Phase, the GNS is created above share folders in the Existing-NAS devices, with mapping of the share folders in the Existing-NAS devices to GNS paths distributed to a key lookup table in the DHT-NAS devices. Each mapping in the key lookup table includes a key, a GNS path, NAS type, IP address of the NAS, and the path within the NAS Share. There is no central GNS mapping table. In a Discovery Phase, the DHT-NAS devices discover the Existing-NAS devices to construct the GNS under the share folders. In a Working Phase, the DHT-NAS devices service GNS requests.

22 Claims, 24 Drawing Sheets

| Key | GNS Path | Type | IP Address of NAS | Path within NAS Share | Others |
|---|---|---|---|---|---|
| 003 | / | P2P | 192.168.1.10 | Share_10 | Sub folders info |
| 005 | /B | NAS | 192.168.2.22 | S_B | |
| ... | | | | | |

| GNS Path | Hash Value | Key |
|---|---|---|
| / | 3 | 003 |
| /A | 13 | 013 |
| /B | 5 | 005 |
| /C | 17 | 017 |
| /A/A1 | 6 | 006 |
| /A/A2 | 32 | 032 |
| /B/B1 | 15 | 015 |
| /B/B2 | 9 | 009 |
| /A/A1/a1 | 8 | 008 |

| Key | GNS path | Type | IP address of NAS | Path within NAS share | Others |
|---|---|---|---|---|---|
| 003 | / | P2P | 192.168.1.10 | Share_10 | Sub folders info |
| 005 | /B | NAS | 192.168.2.22 | S_B | |
| 006 | /A/A1 | NAS | 192.168.1.11 | S_A/A1 | |
| 008 | /A/A/a1 | NAS | 192.168.1.11 | S_A/A1/a1 | |
| 009 | /B/B2 | NAS | 192.168.2.22 | S_B/B2 | |
| ... | | | | | |

| Key | GNS path | Type | IP address of NAS | Path within NAS share | Others |
|---|---|---|---|---|---|
| 013 | /A | NAS | 192.168.1.11 | S_A | |
| 015 | /B/B1 | NAS | 192.168.2.22 | S_B/B1 | |
| 017 | /C | P2P | 192.168.3.30 | S_C | |
| ... | | | | | |

| IP Address | NAS ID | Shared Folder | Free Capacity | Location |
|---|---|---|---|---|
| 192.168.1.11 | Existing-NAS1 | S_A | 50GB | Location1 |
| 192.168.2.22 | Existing-NAS2 | S_B | 80GB | Location2 |
| ... | | | | |

Fig. 37

| Key | GNS Path | Type | IP Address of NAS | Path within NAS Share | Location of NAS | Others |
|-----|----------|------|-------------------|-----------------------|-----------------|--------|
| 013 | /A | NAS | 192.168.1.11 | S_A | Location1 | |
| 015 | /B/B1 | NAS | 192.168.2.22 | S_B/B1 | Location2 | |
| 017 | /C | NAS | 192.168.1.11 | S_C | Location1 | |
| ... | | | | | | |

METHOD AND APPARATUS FOR CONSTRUCTING A DHT-BASED GLOBAL NAMESPACE

BACKGROUND OF THE INVENTION

The rapid growth of file-based information, and today's fast expanding and diverse business environment, have led to isolated information and storage islands within an organization. In these information and storage islands, various NAS (Network Attached Storage) devices having different performance characteristics and capacities, and even from different vendors, make it very difficult to share the information and manage the storage. End users need to know where files are located and map/mount folders shared through NFS (network file system) or CIFS (common internet file system) protocol, referred to as share folders (or simply share) hereafter, in order to access files from different NAS devices. On the other hand, system administrators must spend a great deal of time reconfiguring the system, optimizing the storage utilization, and/or migrating data, due to various needs. These requirements are complicated and may cause system downtime and corresponding interruption to the end users, which is very costly.

A Global Namespace (GNS) that can provide a single namespace, file location independent storage service to the end users, and allow system administrators to more efficiently utilize the storage, is therefore proposed and can be found in the existing art. To accommodate the amount of data growing daily, and given the fact that various NAS devices coexist, a GNS design is expected to have no limitation on scalability, and is also expected to support existing heterogeneous NAS devices. However, existing GNS solutions, such as DFS (Microsoft Distributed File System), NAS Switch ([US20030097454A1], [US2007072917B2]), and P2P (Peer-to-Peer) solutions, either have limited scalability or do not support heterogeneous NAS devices.

In the typical DFS solution, DFS links created for the GNS are shared among domain controllers and root servers. Any modification of the namespace causes the entire DFS metadata to be propagated to all domain controllers and root servers. The number of DFS links that can be created for the namespace is therefore limited in order to reduce the impact on network traffic.

In the typical NAS Switch solution, an appliance device manages the share folders of the NAS devices and constructs a pseudo file system for the clients. The appliance device appears as a single NAS server to the clients and as a single NAS client to the NAS devices. All namespace and user data access must go through the appliance device, making the appliance device a potential performance bottleneck.

Both DFS and NAS Switch solutions support heterogeneous NAS devices and maintain the local namespace within a NAS device; however, they manage the GNS information in a centralized manner with limited scalability.

On the other hand, with the concept of the DHT (Distributed Hash Table), structured P2P technologies have recently become increasingly popular for file sharing in large-scale, geographically-distributed storage systems. Chord ("Chord: A Scalable Peer-to-Peer Lookup Service for Internet Applications", ACM SIGCOMM, 2001) and Tapestry ("Tapestry: An Infrastructure for Fault-tolerant Wide-area Location and Routing", UC Berkeley, 2000) are two typical examples of DHT-based P2P technology found in the existing art. In a DHT-based P2P storage system, files and storage nodes (known as peers) are hashed into the same ID space. Each peer manages a portion of the ID space and cooperates with each other peer to share files, through a logical DHT overlay. By maintaining multiple file copies in the system, peers can join and leave the system dynamically, without affecting the file sharing service to the end users. A DHT-based P2P storage system is highly scalable without any central control point or performance bottleneck, and is highly available by self-repairing the system in the event of storage node join/leave. However, existing NAS devices do not have P2P functionality and cannot construct a P2P storage system, making the existing NAS devices unusable.

It may be possible to construct a P2P storage system, and utilize the existing heterogeneous NAS devices simply as additional storage capacity to the peers. However, this requires the system administrator to manually map/mount the share folders in the existing NAS devices to the peers, making it very difficult for the system administrator when the number of existing NAS devices is large or when peers fail. Further, the files stored in existing NAS devices are purely based on the hash value of the files (for example, the file name), making it impossible to maintain a meaningful local namespace within a NAS device, which is supported by both DFS and NAS Switch solutions.

Hence, there is an increasing need for a GNS solution that can maximize system scalability, support existing heterogeneous NAS devices, and at the same time, maintain a meaningful local namespace within a NAS device.

SUMMARY OF THE INVENTION

The present invention relates to a method and apparatus for constructing a GNS across heterogeneous NAS devices by using DHT-based P2P technology.

A GNS solution that can maximize system scalability, support existing heterogeneous NAS devices, and maintain a meaningful local namespace within a NAS device is represented by a method of constructing a distributed hash table (DHT)-based global namespace (GNS) for a network system including a plurality of network attached storage (NAS) devices connected to each other by a network, the NAS devices including at least one DHT-NAS device defined as a NAS device having DHT functionalities, and at least one Existing-NAS device defined as a NAS device that does not have DHT functionalities; the method comprising the steps of:

in a DHT overlay construction phase, constructing by each DHT-NAS device a DHT overlay of the DHT-NAS devices, in an initial phase, the following steps performed by a processor of the DHT-NAS device executing a namespace initialization program:

gathering information of the Existing-NAS devices, including IP addresses, share folders, and free storage capacity thereof, into an Existing-NAS information table;

creating a GNS hierarchical namespace above the share folders based on the information gathered in the Existing-NAS information table;

executing a key-value pair generation program, generating a (key, value) pair for each GNS path in the GNS hierarchical namespace, wherein the key is the hash value of the GNS path generated by invoking a hashing program, and wherein the value is generated with metadata information of the GNS path including the GNS path entry, the type of device in which the GNS path is stored, the IP address of the corresponding Existing-NAS device, and the path within the share folder; and storing the (key, value) pairs to a key lookup table in the corresponding DHT-NAS devices through the DHT overlay;

in a discovery phase, the following steps performed by the processor of the DHT-NAS device executing a namespace discovery program:

discovering the Existing-NAS devices identified in the key lookup table, and creating the GNS hierarchical namespace under the share folders; and in a working phase, the following steps performed by the processor of the DHT-NAS device executing a request processing program:

checking whether a directory or file request to the GNS namespace has been received, and responding to the request if a directory or file request to the GNS namespace has been received.

A GNS solution that can maximize system scalability, support existing heterogeneous NAS devices, and maintain a meaningful local namespace within a NAS device is further represented by a network system having a distributed hash table (DHT)-based global namespace (GNS), comprising:

a plurality of NAS devices connected to each other by a network, the NAS devices including at least one DHT-NAS device defined as a NAS device having DHT functionalities, and at least one Existing-NAS device defined as a NAS device that does not have DHT functionalities;

wherein each DHT-NAS device includes:

a processor;

a network interface via which the DHT-NAS device is coupled to the network;

a NFS/CIFS protocol module;

a storage management module;

a storage interface arranged to receive and transmit block level data access from the storage management module to a storage and to receive and transmit a response from the storage to the storage management module, wherein the storage management module is arranged to organize the storage provided by the storage interface into shared storage for user files and free storage, a system memory; and a system bus via which the processor is coupled to each of the network interface, the NFS/CIFS protocol module, the storage management module, the storage interface, and the system memory;

wherein the system memory holds a key lookup table, a DHT routing table, an Existing-NAS information table, a DHT routing program, a hashing program, a key-value pair generation program, a namespace initialization program, a namespace discovery program, and a request processing program;

wherein each Existing-NAS device includes:

a network interface via which the Existing-NAS device is coupled to the network;

a NFS/CIFS protocol module;

a storage interface; and a storage management module arranged to organize a storage provided by the storage interface into shared storage for user files and free storage, wherein the storage interface of the Existing-NAS provides a logical storage volume to the storage management module;

wherein the processor executes the DHT routing program, stored in the system memory, to construct a DHT overlay of the DHT-NAS device in a DHT overlay construction phase;

the processor executes the namespace initialization program to perform the following in an initial phase:

gathering information of the Existing-NAS devices, including IP addresses, share folders, and free storage capacity thereof, into the Existing-NAS information table;

creating a GNS hierarchical namespace above the share folders based on the information gathered in the Existing-NAS information table;

executing the key-value pair generation program, generating a (key, value) pair for each GNS path in the GNS hierarchical namespace, wherein the key is the hash value of the GNS path generated by invoking the hashing program, and wherein the value is generated with metadata information of the GNS path including the GNS path entry, the type of device in which the GNS path is stored, the IP address of the corresponding Existing-NAS device, and the path within the share folder; and storing the (key, value) pairs to the key lookup table in corresponding DHT-NAS devices through the DHT overlay;

the processor executes the namespace discovery program to perform the following in a discovery phase:

discovering the Existing-NAS devices identified in the key lookup table, and creating the GNS hierarchical namespace under the share folders; and the processor executes the request processing program to perform the following in a working phase:

checking whether a directory or file request to the GNS namespace has been received, and responding to the request if a directory or file request to the GNS namespace has been received.

There are 2 types of NAS devices in the system: DHT-NAS and Existing-NAS. DHT-NAS devices are NAS devices that have DHT functionalities. That is, DHT-NAS devices are NAS devices that are able to maintain a DHT routing table with partial information of other DHT-NAS devices, and cooperate with each other to form a DHT overlay by executing a DHT routing program. Existing-NAS devices are traditional NAS devices that do not have DHT functionalities, but already have user files stored in the share folders. The DHT-NAS devices form a logical DHT overlay with a global unique ID space, organized into a logical ring where the smallest ID succeeds the largest ID. The global namespace and the associated metadata are mapped to the same ID space and managed by the DHT-NAS devices in a distributed manner.

To construct the global namespace, a GNS hierarchy above the share folders of the Existing-NAS devices is first created and stored in the DHT overlay. The DHT-NAS devices will then construct the GNS hierarchy under the share folders by discovering the files in the share folders of the Existing-NAS devices. The discovered user files can be retained in the Existing-NAS devices to maintain the local namespace within the NAS devices.

To create a new file (or directory), the corresponding GNS metadata will be stored in the DHT overlay to the responsible DHT-NAS device whose Node ID is numerically closest clockwise in the ID space to the hash value of the file's GNS path, and the newly-created file may be stored in the DHT-NAS or Existing-NAS device which holds the parent directory. To access a file (or directory), a user can submit a request to any DHT-NAS device (or node). The request will then be routed to the responsible DHT-NAS device which manages the GNS metadata of the requested file. The responsible DHT-NAS node will then retrieve the file from the location found in the metadata and send the file to the DHT-NAS node which receives the initial user request.

BRIEF DESCRIPTION OF THE DRAWING

While the present written and illustrated disclosure describes exemplary embodiments of the invention, the disclosure is provided by way of illustration and example only, and the invention is not limited thereto. In view of the above:

FIG. 37 is a table in which the location information of Existing-NAS devices is stored in a key lookup table of a DHT-NAS device.

DETAILED DESCRIPTION OF THE PREFERRED EMBODIMENTS

Figure 1:
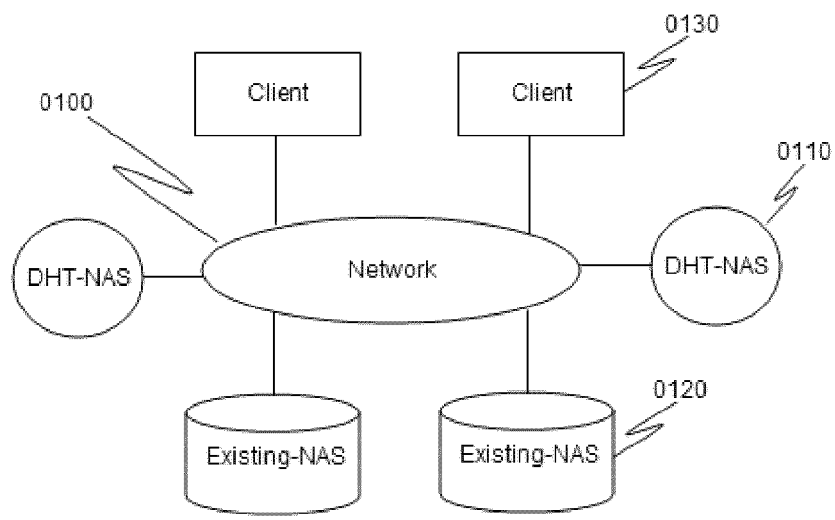
FIG. 1 is an exemplary diagram illustrating an overall system corresponding to a first embodiment.

FIG. 1 is an exemplary diagram illustrating an overall system according to a first embodiment of the present invention. The system includes, for example, multiple NAS devices (such as those identified by reference numerals 0110 and 0120) and clients 0130 connected to a network 0100 (such as a LAN (local area network) or WAN (wide area network)). As shown, there are two types of NAS devices: a DHT-NAS 0110 and an Existing-NAS 0120. DHT-NAS devices 0110 are NAS devices that are able to maintain a DHT routing table with partial information of other DHT-NAS devices 0110, and cooperate with each other to form a DHT overlay by executing a DHT routing program. Existing-NAS devices 0120 are traditional NAS devices that do not have DHT functionalities, but already have user files stored in the share folders. A client 0130 is a device (such as a PC) that utilizes the global namespace (GNS) service to access any data in the system.

Figure 2:
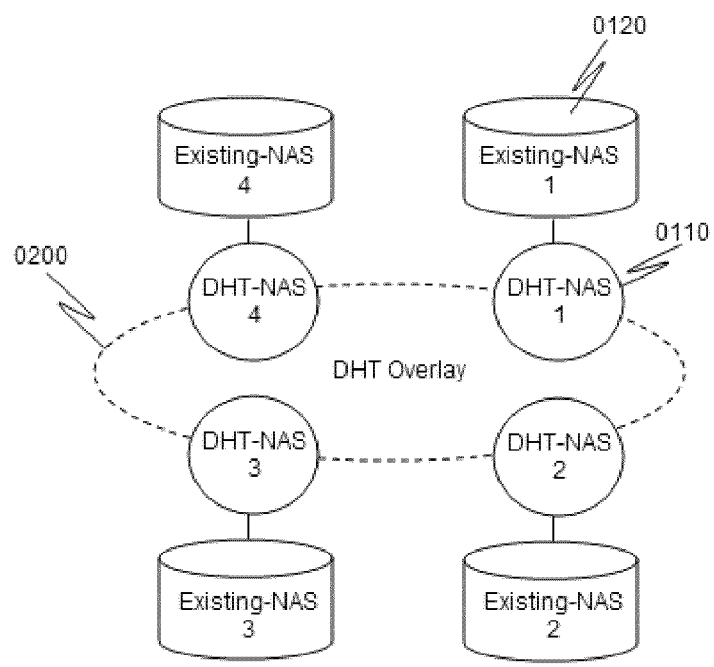
FIG. 2 shows a high level overview of an exemplary logical system architecture of the first embodiment.

FIG. 2 shows a high level overview of a logical system architecture that may be employed in the first embodiment, where a plurality of DHT-NAS devices 0110 cooperate with each other and form a logical DHT overlay 0200. The DHT-NAS devices communicate with and discover the files in the Existing-NAS devices 0120 and construct a global namespace in the DHT Overlay.

Figures 3, 4:
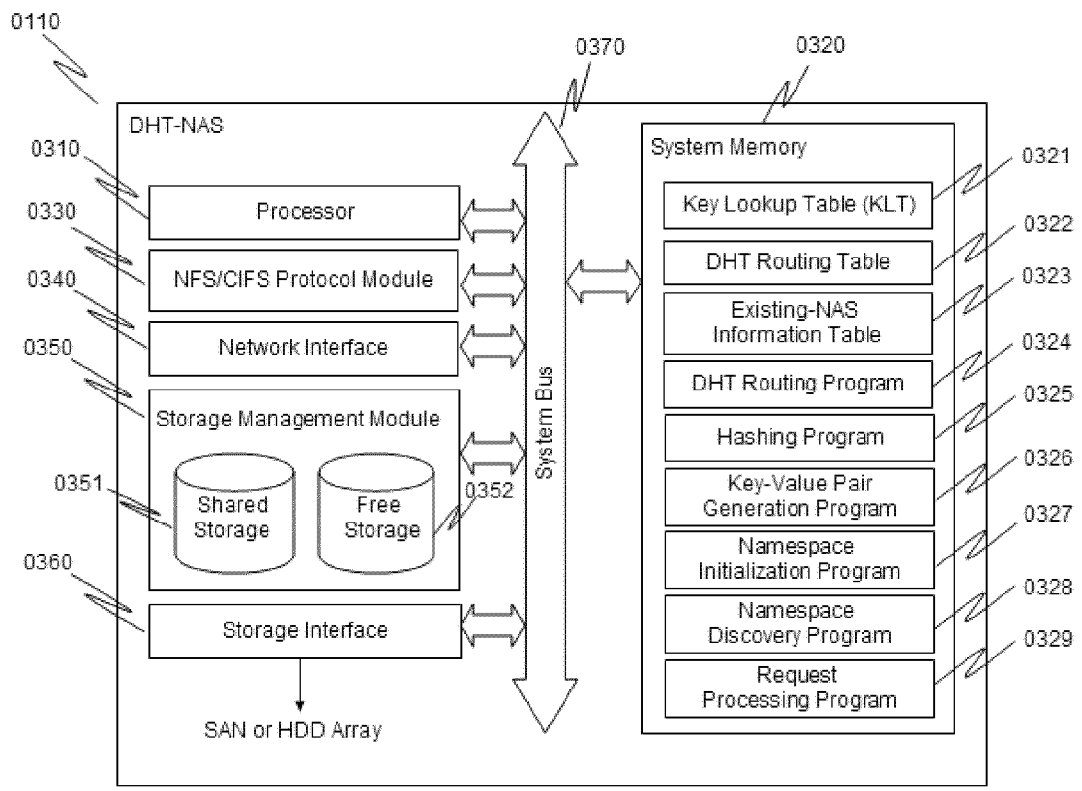
FIG. 3 is a block diagram illustrating an example of the components within a DHT-NAS device.
FIG. 4 is a table showing an example of mapping an IP address to a Node ID by calculating the hash value of the IP address.

FIG. 3 is a block diagram illustrating examples of components of a DHT-NAS device 0110. A DHT-NAS device may consist of, but is not limited to, a processor 0310, a system memory 0320, a network interface 0330, a NFS/CIFS (network file system/common internet file system) protocol module 0340, a storage management module 0350, a storage interface 0360, and a system bus 0370. The system memory

0320 further includes a key lookup table 0321, a DHT routing table 0322, an Existing-NAS information table 0323, a DHT routing program 0324, a Hashing program 0325, a Key-Value pair generation program 0326, a Namespace initialization program 0327, a Namespace discovery program 0328, and a Request processing program 0329, which are used to realize the DHT overlay 0200 and virtualize the global namespace. Each program will be further described hereafter.

The processor 0310 represents a central processing unit that executes the programs. Commands and data communicated among the processor 0310 and other components are transferred via the system bus 0370. The network interface 0330 connects the DHT-NAS 0110 to the network 0100 and is used for communication with other DHT-NAS devices 0110, Existing-NAS devices 0120, and Clients 0130. The NFS/CIFS protocol module 0340 implements both the client and server functions of the NFS/CIFS protocol. The NFS/CIFS protocol module 0340 sends NFS/CIFS requests to other DHT-NAS devices 0110 and Existing-NAS devices 0120, and serves the NFS/CIFS requests sent from the other DHT-NAS devices 0110 and Clients 0130. The storage interface 0360 manages the storage from a storage area network (SAN) or an internal HDD array, and provides a logical storage volume to the storage management module 0350. The Storage interface 0360 receives and transmits block level data access from the Storage management module 0350 to the SAN or internal HDD array, and receives and transmits the response from the SAN or internal HDD array to the Storage management module 0350. The storage management module 0350 organizes the storage provided by the storage interface 0360 into shared storage 0351 and free storage 0352. The user files are stored in the shared storage 0351 and exported for access through the NFS/CIFS protocol module 0340. The free storage 0352 may be utilized by the DHT-NAS device 0110 itself to expand the shared storage 0351.

To construct the DHT overlay 0200, each DHT-NAS device 0110 is assigned a Node ID and joins the overlay 0200 by following the DHT routing protocol implemented in the DHT routing program 0324. The DHT routing protocol can be any DHT-based P2P routing protocol found in the existing art, such as Chord or Tapestry. A DHT-NAS device 0110 obtains its Node ID by executing the Hashing program 0325 to calculate the hash value of its IP address. With a collision-free hash function implemented in the Hashing program 0325, such as 128-bit or 160-bit SHA-1, the Node ID assigned to each DHT-NAS device 0110 will be globally unique. It should be noted that in this description, we use decimal ID space, instead of binary bits, to represent the Node ID, for simplicity of explanation.

FIG. 4 is a table that shows an example of mapping an IP address 0410 to a Node ID 0430, by calculating the hash value 0420 of the IP address 0410. In this example, an 8-bit ID space [0, 127] is illustrated. As an example, the hash value of a DHT-NAS device's IP address 0410, 192.168.1.10, is calculated as 10, and therefore, the Node ID of the DHT-NAS device 0110 is assigned to #10.

Figure 5:
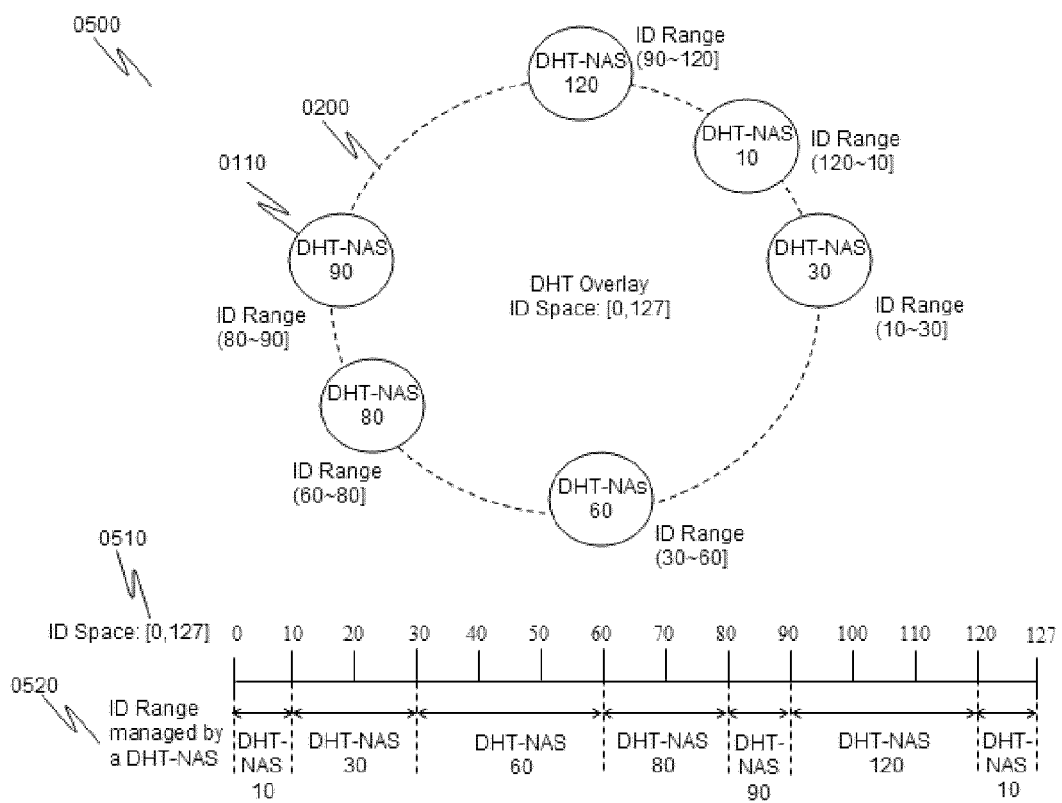
FIG. 5 shows the ID range managed by each DHT-NAS device in an exemplary DHT overlay with the ID space [0,127]

Each DHT-NAS device 0110 in the DHT overlay 0200 is responsible for a range of ID space that has no overlap with the ID ranges managed by other DHT-NAS devices 0110. FIG. 5 shows, at 0500, the ID range 0520 managed by each DHT-NAS device 0110 in a DHT overlay 0200 with the ID space [0, 127] 0510. It should be noted that the ID space 0510 in the DHT overlay 0200 forms a circle, and therefore the ID range 0520 managed by the DHT-NAS device 0110 with Node ID #120 is (90~120], the ID range 0520 managed by the DHT-NAS device 0110 with Node ID #10 is (120~10], and the ID range 0520 managed by the DHT-NAS device 0110 with Node ID #30 is (10~30], and so on.

Figure 6:
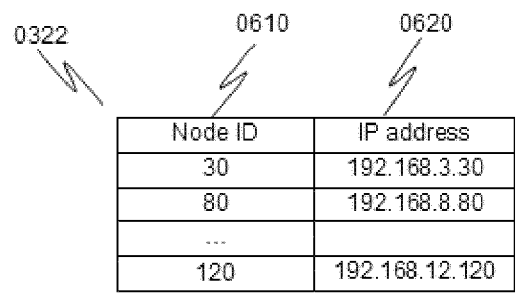
FIG. 6 shows the structure of an exemplary DHT routing table maintained in a DHT-NAS device.

FIG. 6 shows an example of a DHT routing table 0322 maintained in a DHT-NAS device 0110 (referred to below as the current DHT-NAS device 0110) which, in this example, is DHT-NAS 10. The DHT routing table 0322 stores information of other DHT-NAS devices 0110 in the DHT overlay 0200 known by the current DHT-NAS device 0110, and will be used and updated by the DHT routing program 0324. The DHT routing table has at least two columns, for the Node ID 0610 and IP address 0620 of the other DHT-NAS devices 0110. The first entry and the last entry in the DHT routing table are referred to as the successor and the predecessor, respectively. In this example, for DHT-NAS 10, the successor is DHT-NAS 30, and the predecessor is DHT-NAS 120. It should be noted that the Node IDs of the predecessor and current DHT-NASes coordinately define the ID range 0520 managed by the current DHT-NAS device 0110.

Figure 7:
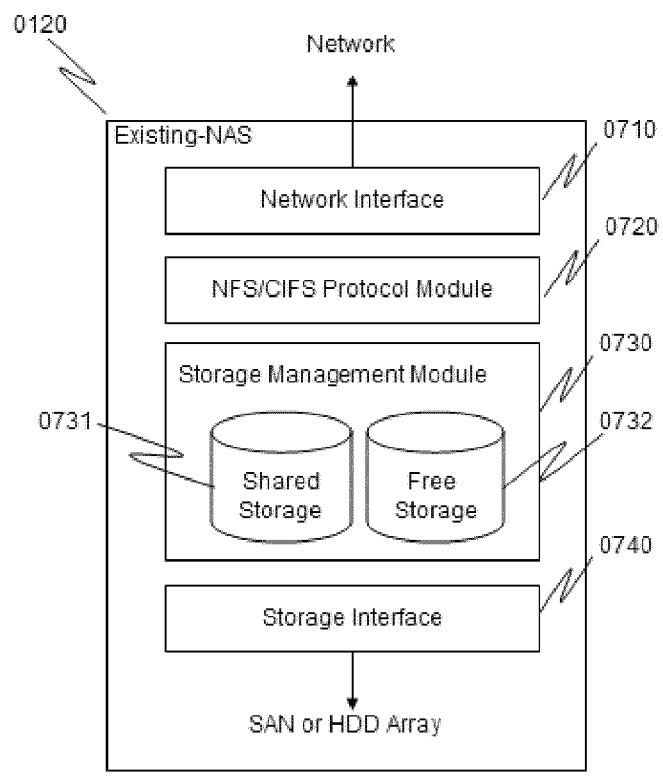
FIG. 7 is a block diagram illustrating the components within an exemplary Existing-NAS device.

FIG. 7 is a block diagram illustrating an example of the components in an Existing-NAS device 0120. An Existing-NAS device may consist of, but is not limited to, a network interface 0710, a NFS/CIFS (network file system/common internet file system) protocol module 0720, a storage management 0730, and a storage interface 0740. The network interface 0710 connects the Existing-NAS device 0120 to the network 0100 and is used for communication with DHT-NAS devices 0110. The NFS/CIFS protocol module 0720 implements the server functions of NFS/CIFS protocol, and serves the NFS/CIFS requests sent from DHT-NAS devices 0110. Similar to a DHT-NAS device 0110, the storage interface 0740 manages the storage from a storage area network (SAN) or an internal HDD array, and provides a logical storage volume to the storage management module 0730. The storage management module 0730 organizes the storage provided by the storage interface 0740 into shared storage 0731 and free storage 0732. The user files are stored in the shared storage 0731 and exported for access through the NFS/CIFS protocol module 0720. The free storage 0732 may be utilized by the Existing-NAS device 0120 itself to expand the shared storage 0731.

Figure 8:
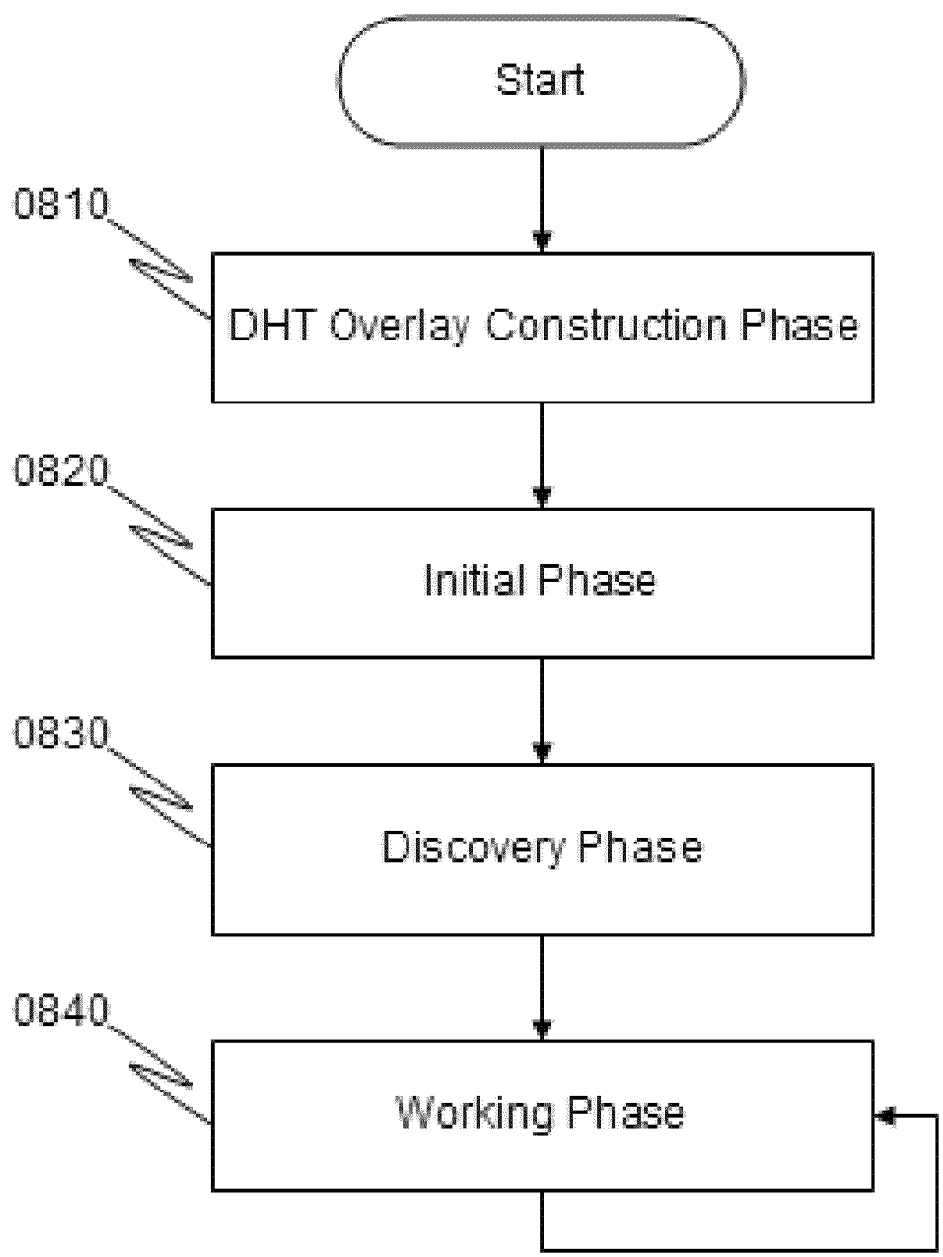
FIG. 8 is a flow diagram illustrating exemplary steps for constructing a GNS.

FIG. 8 is a flow diagram illustrating exemplary steps to construct the GNS. In Step 0810 (the DHT Overlay Construction Phase), DHT-NAS devices 0110 cooperate with each other and construct a DHT overlay 0200. In Step 0820 (the Initial Phase), the first DHT-NAS device 0110 that joins the DHT overlay 0200 creates the GNS namespace above the share folders in Existing-NAS devices 0120. In Step 0830 (the Discovery Phase), the DHT-NAS devices 0110 discover the Existing-NAS devices 0120 to construct the GNS namespace under the share folders. After Step 0830, the system remains at the Working Phase (Step 0840) to serve the GNS requests. These steps will be further described hereafter.

Figure 9:
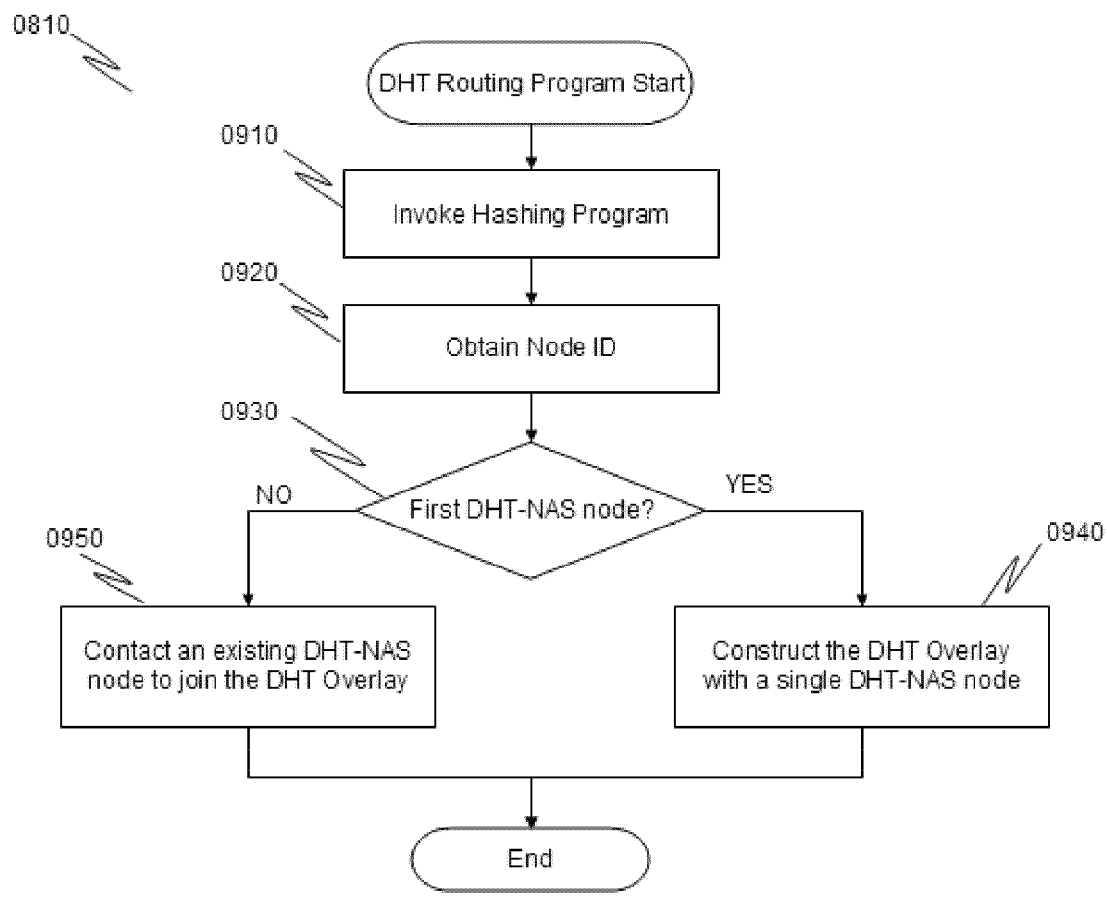
FIG. 9 is a flow diagram of an exemplary DHT overlay construction phase performed in constructing the GNS.

FIG. 9 is a flow diagram of an example of the DHT overlay construction phase (Step 0810). DHT-NAS devices 0110 construct the DHT overlay 0200 by executing the DHT routing program 0324. In Step 0910, the DHT routing program 0324 in a DHT-NAS device 0110.invokes the Hashing program 0325. In Step 0920, the DHT-NAS device 0110 obtains its Node ID 0430 by calculating the hash value 0420 of its IP address 0410. In Step 0930, the DHT-NAS device 0110 checks whether it is the first DHT-NAS device 0110 in the system. If YES, in Step 0940, the DHT-NAS device 0110 constructs the DHT overlay 0200 with itself as the single DHT-NAS device 0110. If NO in Step 0930, in Step 0950, the DHT-NAS device 0110 sends a join request to any of the existing DHT-NAS devices 0110, to join the DHT overlay 0200, by following the DHT routing protocol implemented in the DHT routing program 0324.

Figure 10:
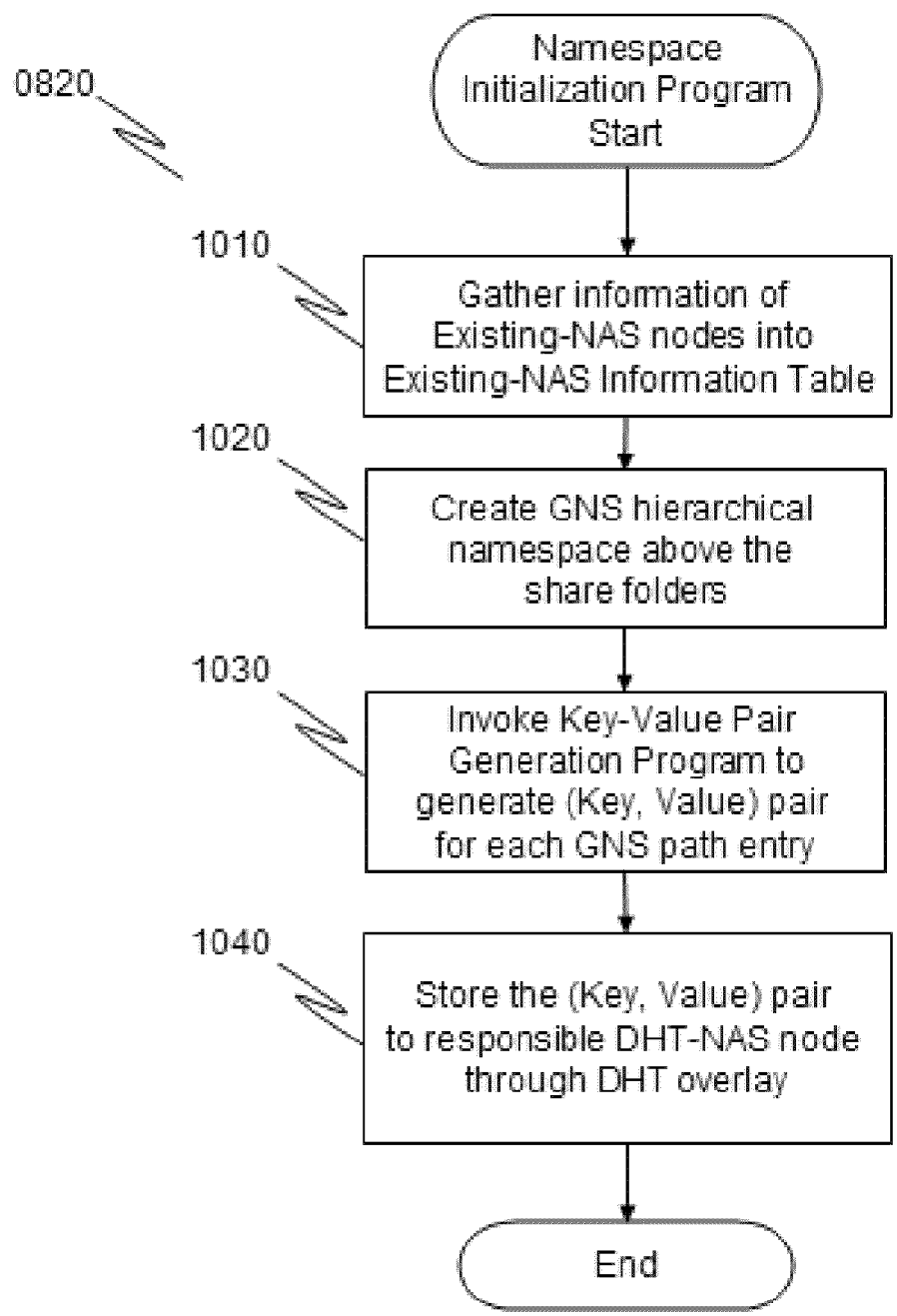
FIG. 10 is a flow diagram of an exemplary initial phase performed in constructing the GNS.
Figure 11:
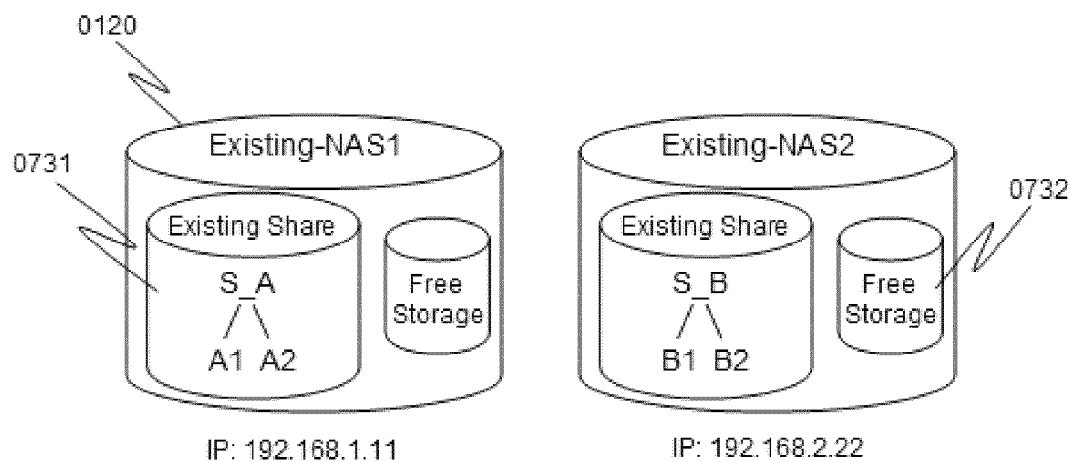
FIG. 11 shows an example illustrating information of Existing-NAS devices gathered in the initial phase.

FIG. 10 is an example of a flow diagram of the Initial Phase (Step 0820). The Initial Phase is carried out by the first DHT-NAS device 0110 that joins the DHT overlay 0200 by executing the Namespace initialization program 0327. In Step 1010, the DHT-NAS device 0110 gathers the information of Existing-NAS devices 0120, such as the IP address, share folders, and free storage capacity thereof, into the Existing-NAS information table 0323. FIG. 11 shows an example of the Existing-NAS information table 0323 illustrating the gathered information of Existing-NAS devices 0120. In this example, there are two Existing-NAS devices 0120, Existing-NAS1 and Existing-NAS2, having IP addresses 192.168.1.11 and 192.168.2.22, respectively. Existing-NAS1 has a share folder S_A and Existing-NAS2 has a share folder S_B. All of the above information is gathered into the Existing-NAS information table 0323 which consists of, but is not limited to, four columns (IP Address 1110, NAS ID 1120, share folder 1130, and free capacity 1140).

Figure 12:
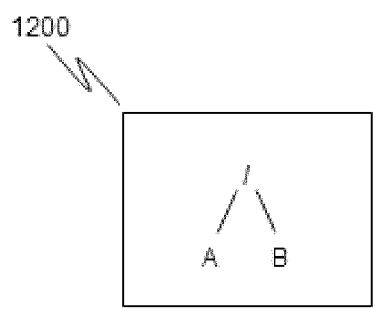
FIG. 12 shows one possible implementation of a GNS hierarchical namespace.

Referring back to FIG. 10, in Step 1020, the DHT-NAS device 0110 creates the GNS hierarchical namespace above the share folders based on the information gathered in the Existing-NAS information table 0323. FIG. 12 shows one possible implementation 1200 by creating the GNS root directory "/" and one sub-directory ("/A" and "/B" in this example) for each share folder 1130 in Existing-NAS devices 0120. Of course, a more meaningful and complicated GNS hierarchy with more than two levels can be created in Step 1020. The example shown in FIG. 12 is for simplicity of explanation.

Figures 13, 14:
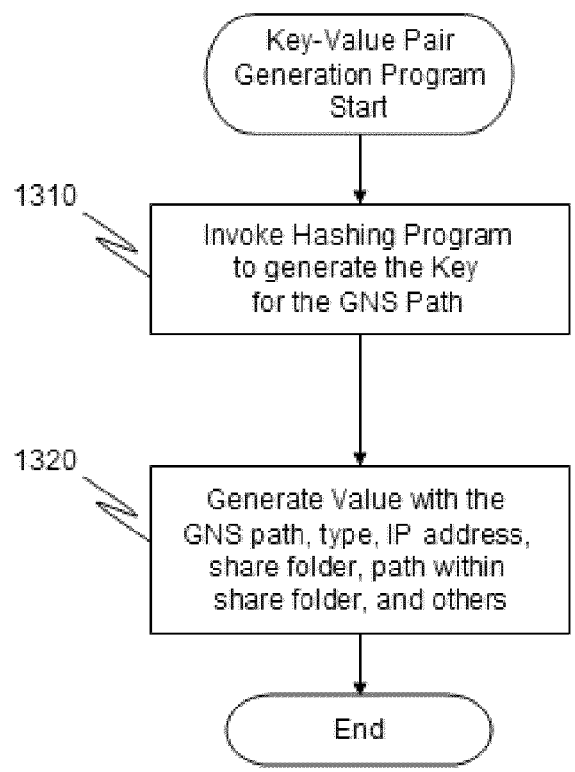
FIG. 13 is a flow diagram illustrating exemplary steps of a Key-Value generation program.
FIG. 14 is a table showing an example of mapping a GNS path to a key by calculating the hash value of the GNS path.

Referring back to FIG. 10 again, in Step 1030, the DHT-NAS device 0110 invokes the Key-Value pair generation program 0326 to generate a (key, value) pair for each GNS path entry created in Step 1020. FIG. 13 is a flow diagram illustrating exemplary steps of the Key-Value pair generation program 0326. In Step 1310, the DHT-NAS device 0110 invokes the Hashing program 0325 to generate the Key for the GNS path. In Step 1320, the Value is generated with the metadata information including, but not limited to, the GNS path, type, IP address of the corresponding Existing-NAS device 0120, share folder, and the path within the share folder. These metadata information will be further described in FIG. 16.

FIG. 14 shows an example of mapping GNS path 1410 to key 1430, by calculating the hash value 1420 of the GNS path. In this example, the hash value of the root directory "/" is 3, and therefore the key generated for "I" is #003. Similarly, the keys generated for the GNS paths "/A" and "/B" are #013 and #005, respectively.

Referring back to FIG. 10 again, in Step 1040, the DHT-NAS device 0110 stores the (key, value) pairs generated in Step 1030 to the responsible DHT-NAS devices 0110 through the DHT overlay 0200.

Figures 15, 16:
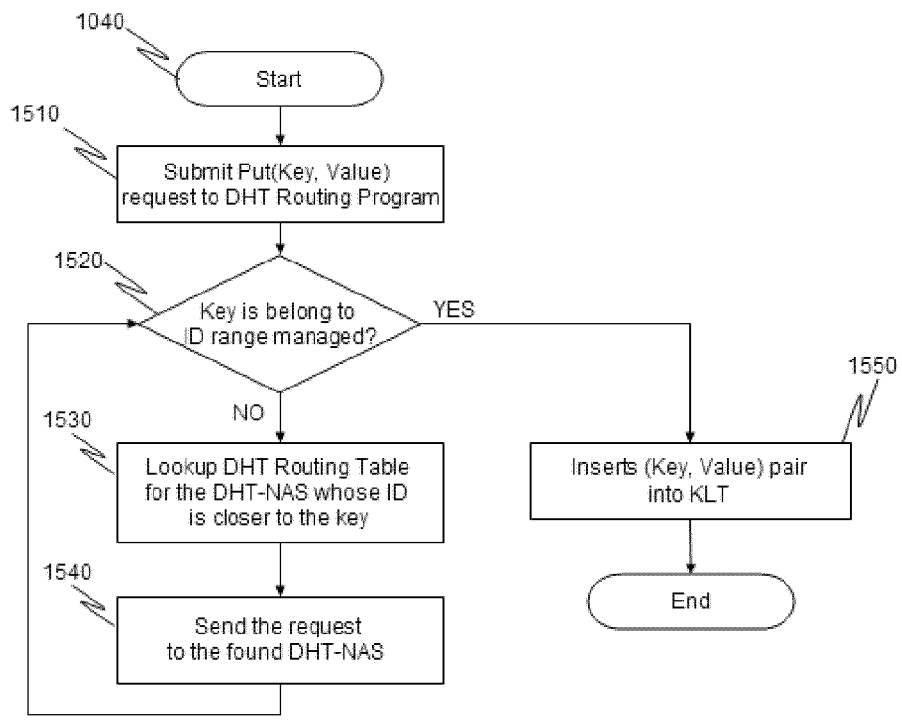
FIG. 15 is a flow diagram illustrating exemplary steps for storing a (key, value) pair to a responsible DHT-NAS device through the DHT overlay.
FIG. 16 is an example of a key lookup table maintained in a DHT-NAS device.

It should be noted that the mapping of the share folders in Existing-NAS devices 0120 to the GNS path entries 1410 are distributed to the key lookup table 0321 in DHT-NAS devices 0110 (refer to FIG. 16). There is no central GNS mapping table required in the presented invention.

FIG. 15 is a flow diagram illustrating exemplary steps constituting Step 1040, to store a (key, value) pair to the responsible DHT-NAS device 0110 through the DHT overlay 0200. In Step 1510, the DHT-NAS device 0110 submits a Put (key, value) request to the DHT routing program 0324. In Step 1520, the DHT-NAS device 0110 checks whether the key in the request belongs to the ID range 0520 for which it is responsible. If NO, in Step 1530, the DHT-NAS looks up the DHT routing table 0322 to find another DHT-NAS device 0110 whose Node ID 0610 is next numerically closer to the key, e.g., next clockwise in the ID space as in FIG. 5 (to the successor to the DHT-NAS). In Step 1540, the DHT-NAS device 0110 sends the Put (key, value) request to the DHT-NAS device 0110 found in Step 1530. Then, the Step 1520 is repeated by the DHT-NAS device 0110 found in Step 1530. If YES in the repeated Step 1520, in Step 1550, the DHT-NAS device 0110 extracts the metadata information from the (key, value) pair and inserts the information into the key lookup table 0321.

FIG. 16 shows an example of the structure of key lookup table 0321 maintained in a DHT-NAS device 0110 (in this example, DHT-NAS 10). The key lookup table 0321 consists of, but is not limited to, six columns, including key 1610, GNS path 1620, type 1630, IP address of the NAS 1640, the path within NAS Share 1650, and others 1660. The key 1610 is the hash value of the GNS path 1620. Type 1630 is either "P2P" or "NAS". The "NAS" type means that the GNS path entry is currently hosted in an Existing-NAS 0120, while the "P2P" type means that the GNS path entry is stored at a DHT-NAS device 0110. The IP address of the NAS 1640 and the path within the NAS Share 1650 further describe the location of the GNS path entry within a NAS device. Others 1660 are used to store other meaningful information about the GNS path entry (for example, the created time, access control, or sub-folder information for a "P2P"-type directory GNS path entry.

Figures 17, 18:
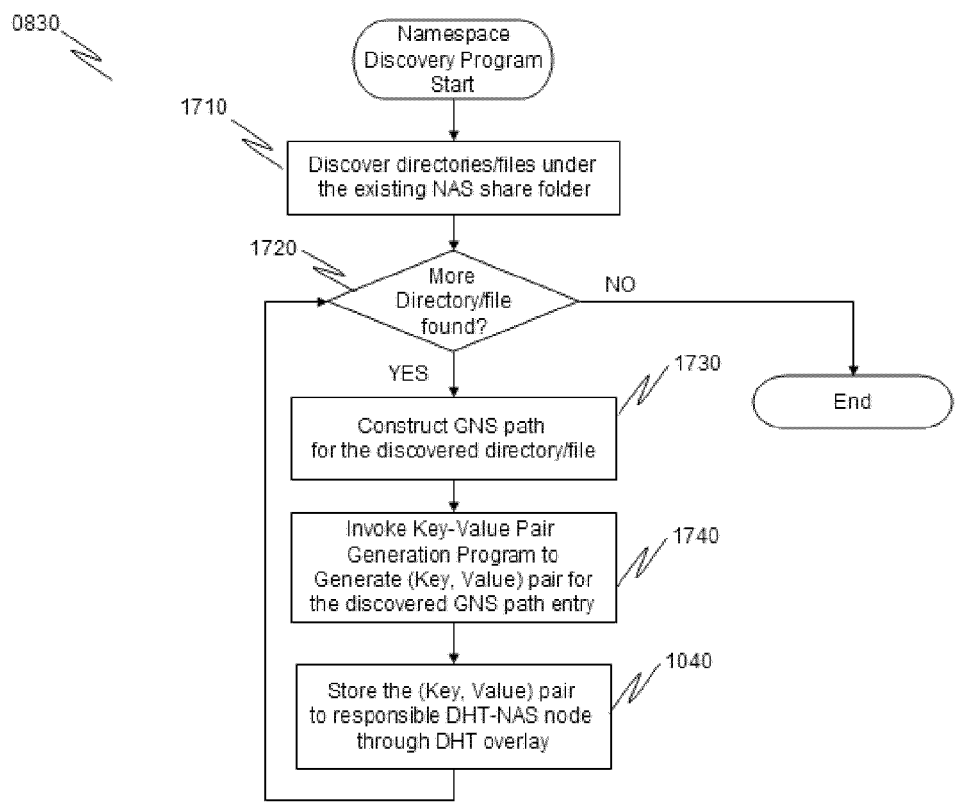
FIG. 17 is a flow diagram of an exemplary discovery phase performed in constructing the GNS.
FIG. 18 is an example of a key lookup table by which a DHT-NAS device constructs the GNS path by combining the GNS path information of a parent directory.

FIG. 17 is a flow diagram of the Discovery Phase (Step 0830). A DHT-NAS device 0110 will execute the Namespace Discovery program 0328 when inserting a "NAS"-type GNS path entry into the key lookup table 0321. In Step 1710, the DHT-NAS device 0110 discovers the directories and files under the path within NAS Share 1650 in the corresponding Existing-NAS device 0120 with the IP Address 1640. In Step 1720, the DHT-NAS device 0110 checks whether any directory or files are found (or discovered). For each directory or file found, in Step 1730, the DHT-NAS device 0110 constructs the GNS path by combining the GNS path information of the parent directory. For example, in FIG. 18, for the file (or directory) "S_B/B2" discovered in an Existing-NAS 0120 with IP address 192.168.2.22, the GNS path is set to "/B/B2" as the GNS path for the parent directory "S_B" is "/B".

Referring back to FIG. 17, in Step 1740, the DHT-NAS device 0110 invokes the Key-Value pair generation program 0326 to generate a (key, value) pair for the GNS path entry created in Step 1730. Thereafter, the (key, value) pair is stored to the responsible DHT-NAS devices 0110 through the DHT overlay 0200, which has already been described in Step 1040 (refer to FIG. 15). This process (Steps 1720, 1730, 1740, and 1040) repeats until no more directories/files can be found.

Figure 19:
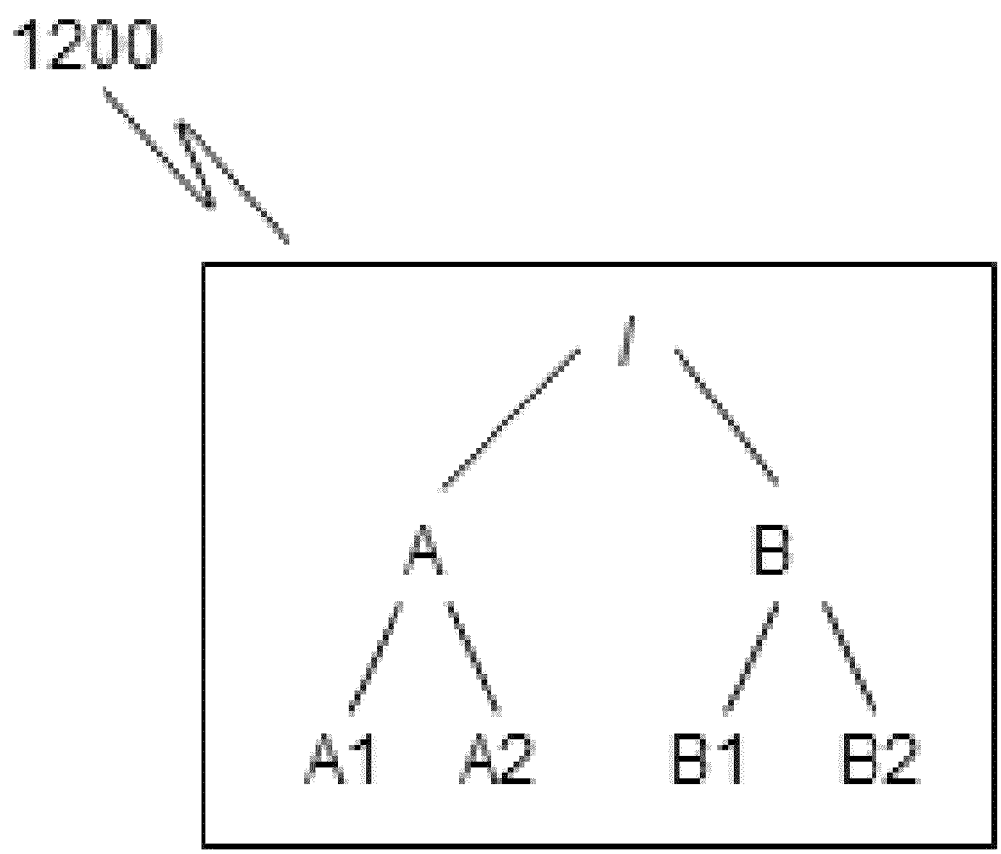
FIG. 19 shows an example of a GNS hierarchy constructed after the discovery phase, for the Existing-NAS 1 and Existing-NAS2 in FIG. 11 and the GNS hierarchy above the share folder created in FIG. 12.

FIG. 19 shows an example of the GNS hierarchy 1200 constructed after the Discovery Phase (Step 0830), given the Existing-NAS1 and Existing-NAS2 in FIG. 11, and the GNS hierarchy 1200 above the share folder created in FIG. 12.

Figure 20:
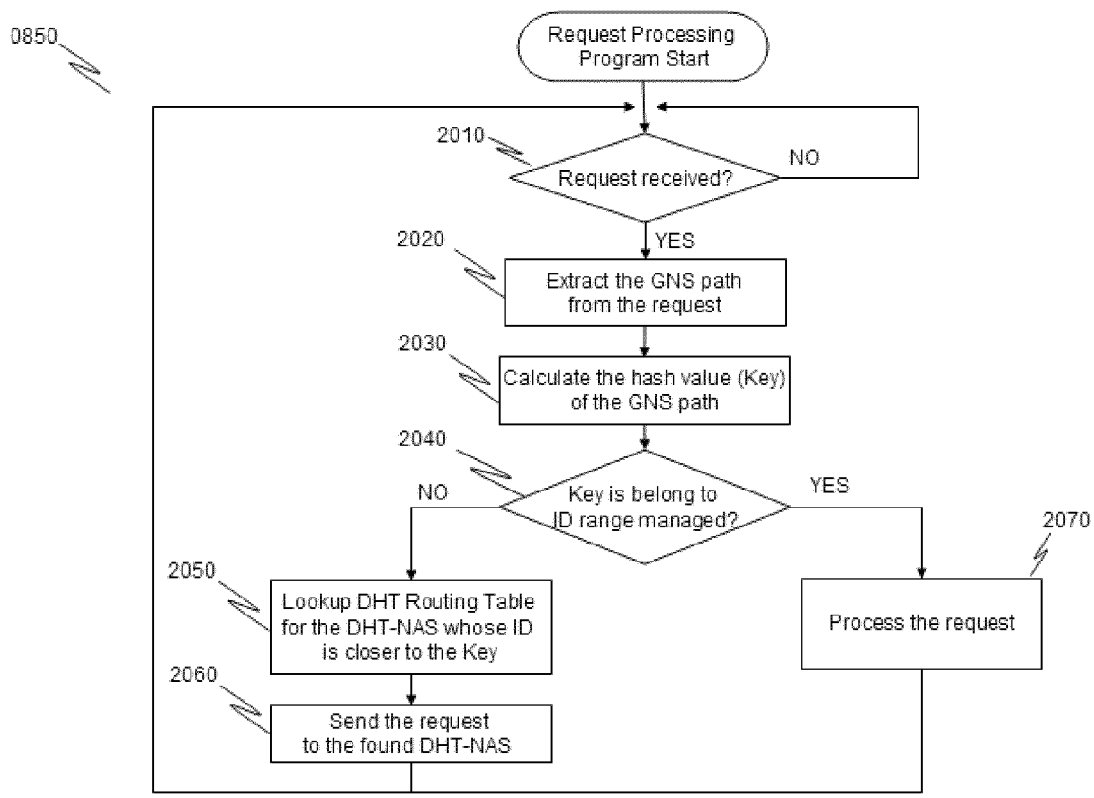
FIG. 20 is a flow diagram illustrating an exemplary working phase performed in constructing the GNS.

FIG. 20 is an example of a flow diagram illustrating the Working Phase (Step 0840). Each DHT-NAS device 0110 executes the Request processing program 0329 during the Working Phase. In Step 2010, the DHT-NAS device 0110 checks whether any GNS request has been received. If NO, the DHT-NAS device 0110 remains at the Working Phase and waits for GNS requests. If YES, in Step 2020, the requested GNS path is extracted from the request, and in Step 2030, the key of the GNS path 1130 is calculated by executing the using the Hashing program 0325. In Step 2040, the DHT-NAS device 0110 checks whether the key belongs to the ID range 0520 for which it is responsible. If NO, in Step 2050, the DHT-NAS device 0110 looks up the DHT routing table 0322 to find another DHT-NAS device 0110 whose Node ID 0610 is numerically closer clockwise in the ID space to the key. In Step 2060, the DHT-NAS device 0110 sends the GNS request to the DHT-NAS device 0110 found in Step 2050, and remains at the Working Phase, repeating Step 2010 to serve other GNS requests. If YES in Step 2040, in Step 2070, the DHT-NAS device 0110 will process the GNS request and remain at the Working Phase, repeating Step 2010 to serve other GNS requests.

Figure 21:
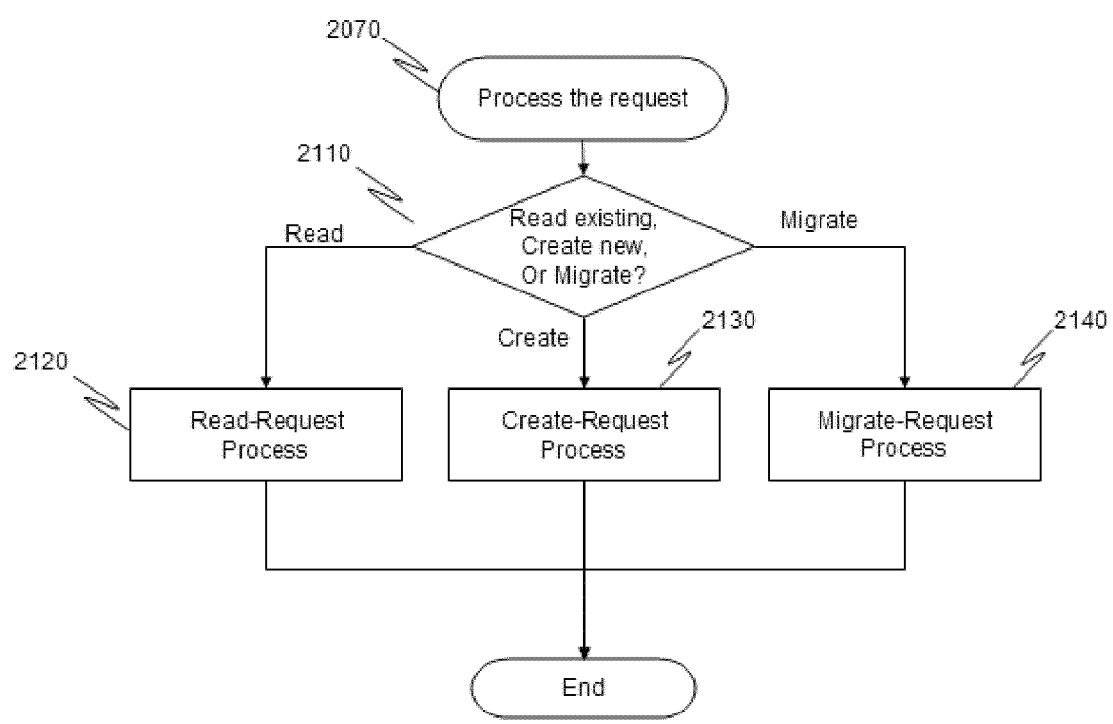
FIG. 21 is a flow diagram further illustrating an exemplary step for processing a GNS request.

FIG. 21 is an example of a flow diagram further illustrating the Step 2070 to process a GNS request. In Step 2110, the DHT-NAS device 0110 checks whether the request is to read an existing GNS namespace, to create a new GNS path entry, or to migrate a file/directory from one NAS device to another. If it is a read request, in Step 2120, the read-request process is invoked. If it is a create request, in Step 2130, the create-request process is invoked. If it is a migrate request, in Step 2140, the migrate-request process is invoked.

Figure 22:
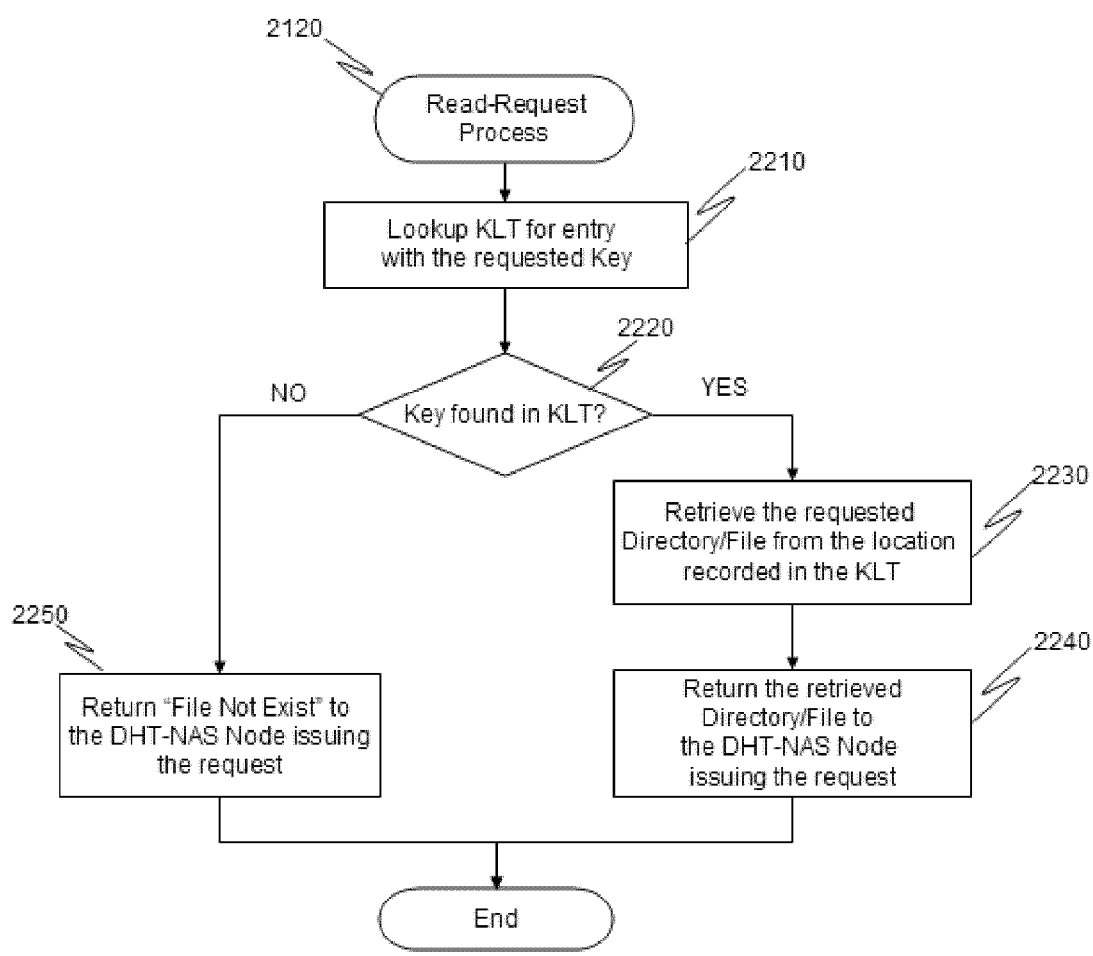
FIG. 22 is a flow diagram illustrating an exemplary read-request process of the processing of a GNS request in FIG. 21.

FIG. 22 is a flow diagram illustrating the read-request process (Step 2120). In Step 2210, the DHT-NAS device 0110 searches the key lookup table 0321 to look up an entry with the requested key. In Step 2220, the DHT-NAS device 0110 checks whether the requested key is found in the key lookup table 0321. If YES, in Step 2230, the DHT-NAS device 0110 retrieves the requested GNS file or directory from the location (1640 and 1650) recorded in the key lookup table. Thereafter, in Step 2240, the DHT-NAS device 0110 returns the retrieved GNS file or directory to the DHT-NAS device 0110 issuing the GNS request. If NO in Step 2220, in Step 2250, the DHT-NAS device 0110 returns a "File Does Not Exist" message to the DHT-NAS device 0110 issuing the GNS request.

Figure 23:
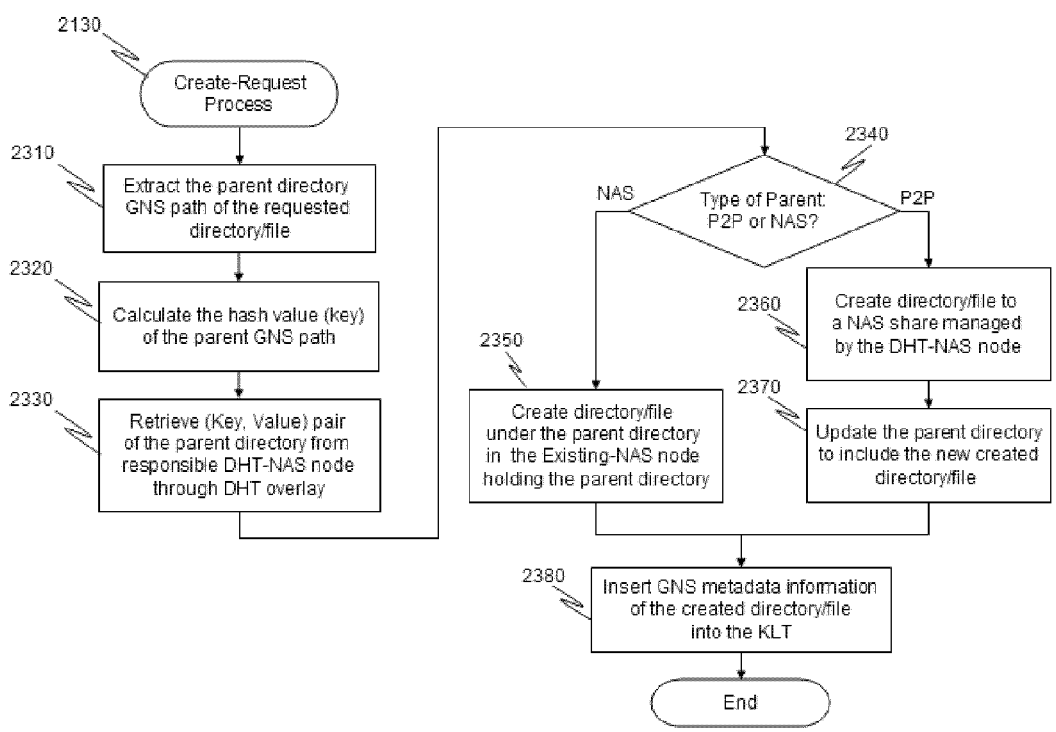
FIG. 23 is a flow diagram illustrating an exemplary create-request process of the processing of a GNS request in FIG. 21.

FIG. 23 is an example of a flow diagram illustrating the create-request process (Step 2130). In Step 2310, the DHT-NAS device 0110 further extracts the GNS path of the parent directory of the requested file/directory, and calculates the key of the parent GNS path by executing the Hashing program 0325, in Step 2320. In Step 2330, the DHT-NAS device 0110 retrieves the (key, value) pair of the parent directory from the responsible DHT-NAS node 0110 through the DHT overlay 0200. Step 2330 is very similar to Step 1040, except that the request submitted to the DHT overlay is Get (key, value), instead of Put (key, value). In Step 2340, the DHT-NAS device 0110 checks whether the type 1630 of parent directory is "P2P" or "NAS". If the type is "NAS", in Step 2350, the new directory/file is created under the parent directory in the Existing-NAS device 0120 holding the parent directory. Otherwise, if the type is "P2P" in Step 2340, in Step 2360, the new directory/file is created to a local share folder in the DHT-NAS device 0110. In Step 2370, the DHT-NAS device 0110 updates the parent directory to include the newly-created directory/file. In Step 2380, the DHT-NAS device 0110 inserts the GNS metadata information of the created directory/file into the key lookup table 0321.

FIGS. 24, 25, 26, 27 and 28 together illustrate an example of a GNS namespace, GNS namespace distribution among the NAS devices, and the key lookup table maintained in DHT-NAS 10 and DHT-NAS 30, during the create-request process (Step 2130).

Figures 24, 25:
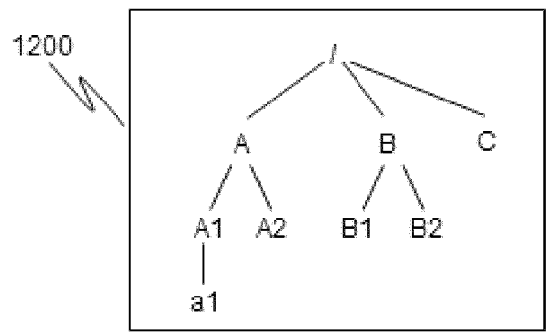
FIG. 24 shows an example of a GNS namespace, including two new GNS path entries created during the working phase.
FIG. 25 shows an example of the mapping from a GNS path to a key, by calculating the hash value of the GNS path.

FIG. 24 shows an example of the GNS namespace, where file "/A/A1/a1" and directory "/C" are the two new GNS path entries created during the Working Phase (compare the GNS namespace in FIG. 19). FIG. 25 shows an example of the mapping 1400 from GNS path 1410 to key 1430, by calculating the hash value 1420 of the GNS path 1410.

Figures 26, 27:
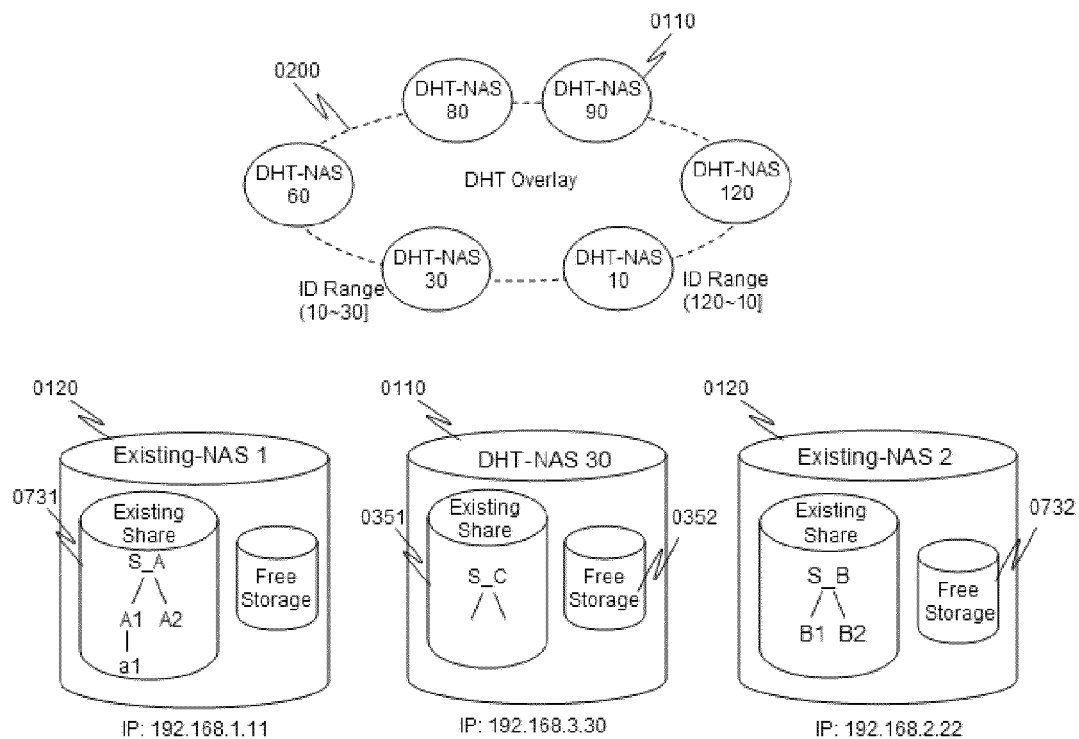
FIG. 26 shows an example of the GNS namespace distribution among the NAS devices.
FIG. 27 is an example of a key lookup table maintained in a DHT-NAS device assigned with a new share folder created in free storage of a corresponding Existing-NAS device.
Figures 28, 29:
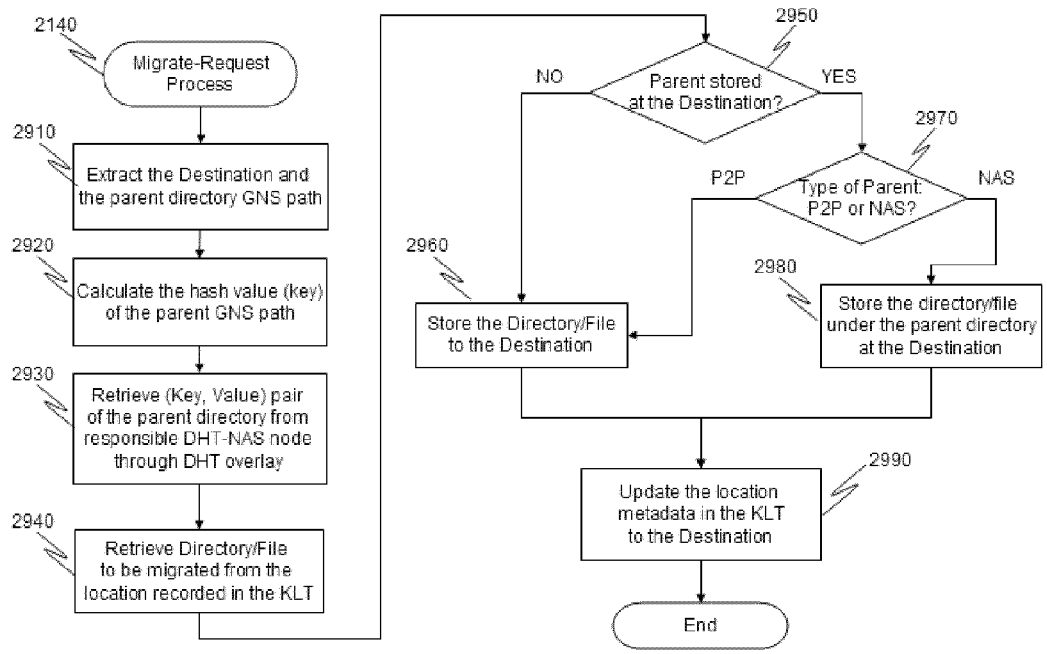
FIG. 28 is another example of a key lookup table maintained in a DHT-NAS device assigned with a new share folder created in free storage of a corresponding Existing-NAS device.
FIG. 29 is a flow diagram illustrating an exemplary migrate-request process of the processing of a GNS request in FIG. 21.

FIG. 26 shows an example of the GNS namespace distribution among the NAS devices. The ID range 0520 managed by DHT-NAS 10 is (120~10] and the ID range managed by the DHT-NAS 30 is (10~30]. Before the file "/A/A1/a1" and the directory "/C" are created, the existing share S_A in Existing-NAS1 hosts the entire directory "/A", and the existing share S_B in Existing-NAS2 hosts the entire directory "/B" in the GNS namespace (refer to the example in FIG. 11). As the key of the GNS path "/A/A1/a1" is 008 (refer to FIG. 25), the GNS metadata information of file "/A/A1/a1" is stored in the key lookup table 0321 of DHT-NAS 10, as shown in FIG. 27. Referring back to FIG. 26, the real file "S_A/A1/a1" is created in Existing-NAS1 for "/A/A1/a1", due to the type 1630 of the parent GNS path "/A/A1" being "NAS" and the physical location "S_A/A1" in Existing-NAS1. On the other hand, as the key of the GNS path "/C" is 017 (refer to FIG. 25), the GNS metadata information of directory "/C" is stored in the key lookup table 0321 of DHT-NAS 30, as shown in FIG. 28. Referring back to FIG. 26 again, due to the type of the parent GNS path "/" being "P2P", the directory "/C" may be created in a local share folder managed by DHT-NAS 30. In this example, the directory "/C" is stored in DHT-NAS 30, by creating a new share folder "S_C".

FIG. 29 is a flow diagram illustrating the migrate-request process (Step 2140). In Step 2910, the DHT-NAS device 0110 further extracts the migration destination (such as the NAS IP address and the share folder) and the GNS path of the parent directory, and calculates the key of the parent GNS path by executing the Hashing program 0325 in Step 2920. In Step 2930, the DHT-NAS device 0110 retrieves the (key, value) pair of the parent directory from the responsible DHT-NAS node 0110 through the DHT overlay 0200. In Step 2940, the DHT-NAS device 0110 retrieves the directory/file to be migrated from the location recorded in the key lookup table 0321. In Step 2950, the DHT-NAS device 0110 checks whether the location of the parent directory is at the migration destination. If NO, in Step 2960, the DHT-NAS device 0110 simply stores the directory/file to the destination. If YES in Step 2950, in Step 2970, the DHT-NAS device 0110 further checks whether the type 1630 of the parent directory is "P2P" or "NAS". If the type is "P2P", the DHT-NAS device 0110 again stores the directory/file to the destination. Otherwise, if the type is "NAS", in Step 2980, the DHT-NAS device 0110 stores the directory/file to the destination under the GNS parent directory. In Step 2990, the DHT-NAS device 0110 updates the location metadata (1640 and 1650) of the migrated directory/file in the key lookup table to the real location in the destination NAS device.

A second embodiment of the present invention will be described next. The explanation will mainly focus on the differences from the first embodiment.

In the first embodiment, all the Existing-NAS devices 0120 are treated as being the same when constructing the GNS, without differentiating the performance of the NAS devices. To migrate a file from one NAS device to another, the client 0130 needs to provide the IP address of the destination NAS device.

Figure 30:
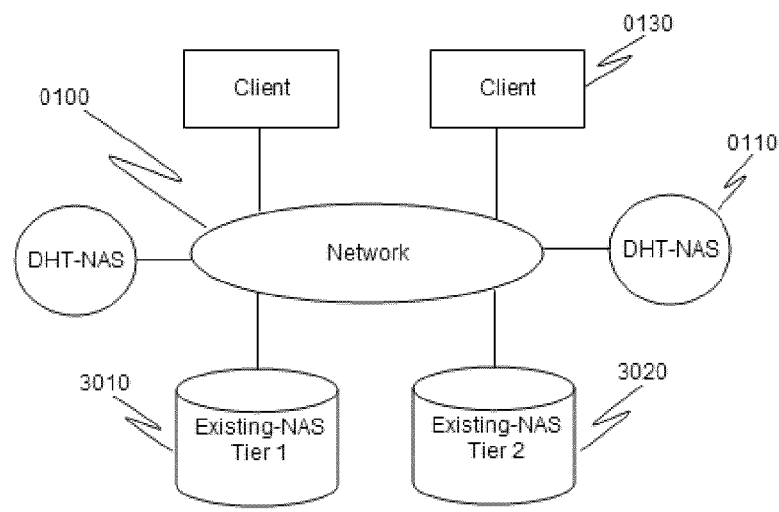
FIG. 30 shows an example of an overall system according to a second embodiment where different tiers of Existing-NAS devices are connected to the network.

FIG. 30 shows an example of an overall system according to the second embodiment, in which different tiers of Existing-NAS devices 0120 are connected to the network 0100. In this example, a Tier1 NAS device (such as an FC NAS) 3010 has better performance than a Tier2 NAS device (such as a SATA NAS) 3020. It should be noted that the system can consist of more than two NAS tiers. The example shown in FIG. 30 is for simplicity of explanation.

Figure 31:
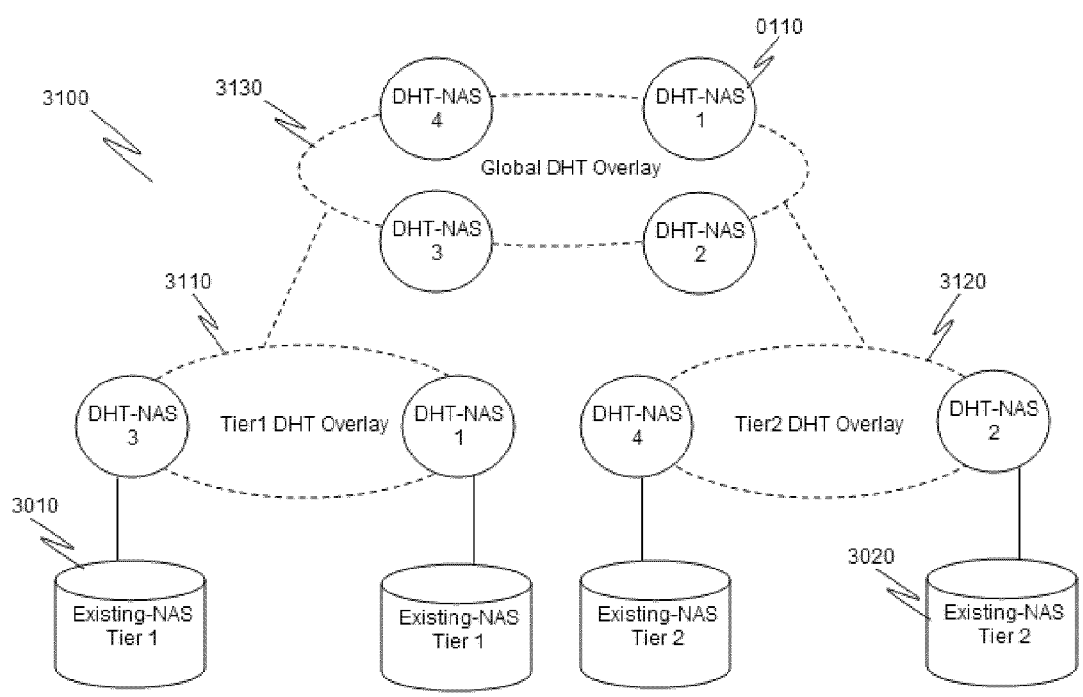
FIG. 31 shows an example of a hierarchical DHT overlay constructed for the system of the second embodiment.

During the DHT overlay construction phase (Step 0810), a hierarchical DHT overlay 3100 is constructed as shown in FIG. 31. A Tier1 DHT overlay 3110 and a Tier2 DHT overlay 3120 are constructed to virtualize the Tier1 Existing-NAS devices 3010 and Tier2 Existing-NAS devices 3020, respectively. There is also a Global DHT overlay 3130, involving all the DHT-NAS devices 0110 in the system. A DHT-NAS device 0110 belongs to only one Tier DHT overlay and the Global DHT overlay 3130.

Figure 32:
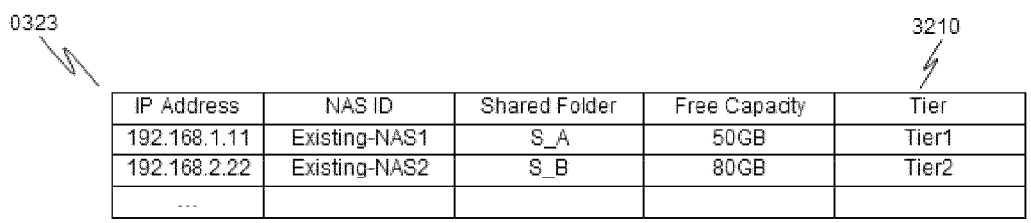
FIG. 32 shows an example of the information of Existing-NAS devices gathered in the Existing-NAS information table during the initial phase according to the second embodiment.
Figure 33:
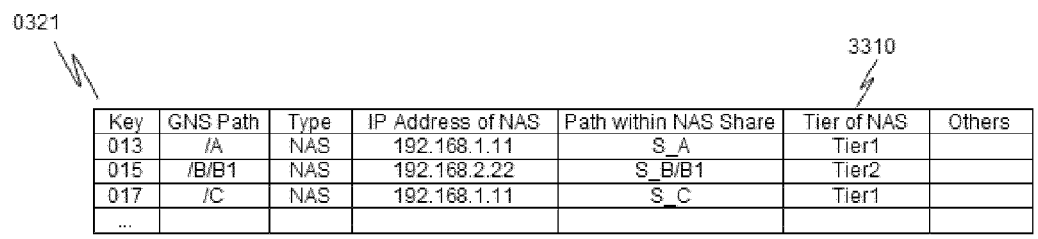
FIG. 33 shows an example of tier information stored in a key lookup table of a DHT-NAS device according to the second embodiment.

FIG. 32 shows an example of the information of Existing-NAS devices 3010 and 3020 gathered in the Existing-NAS information table 0323, including the tier information 3210, during the Initial Phase (Step 0820). The tier information 3210 is then included in the (key, value) pairs generated in the Initial Phase (Step 1030) and the Discovery Phase (Step 1740), by the Key-Value pair generation program 0326. As a result, the tier information 3210 is stored in the key lookup table 0321 of a DHT-NAS device 0110, as shown in FIG. 33. The tier of the NAS 3310 indicates the tier to which the NAS holding the GNS entry belongs.

During the Working Phase (Step 0840), when receiving a GNS request to migrate a file, a DHT-NAS device 0110 extracts the destination tier information 3210 from the request and sends the request to the responsible DHT-NAS device 0110 in the specific tier DHT overlay 3110 or 3120. The responsible DHT-NAS device 0110 then checks whether the parent GNS path entry is also stored in the same tier DHT overlay. If YES and the type of the parent GNS path entry is "NAS", the file is stored in the Existing-NAS device 0120 hosting the parent GNS entry. Otherwise, the file is stored in the responsible DHT-NAS device 0110 in the specific tier DHT overlay.

Therefore, with the second embodiment, it is easier for a client 0130 to migrate a file from one NAS device to another, by providing only the destination tier number instead of the IP address of the destination NAS device.

A third embodiment of the present invention will be described in the following.

In the first and second embodiments, the geographical locations of NAS devices are omitted, making it difficult to migrate a file from one location to another, or to create a file at specific location.

Figure 34:
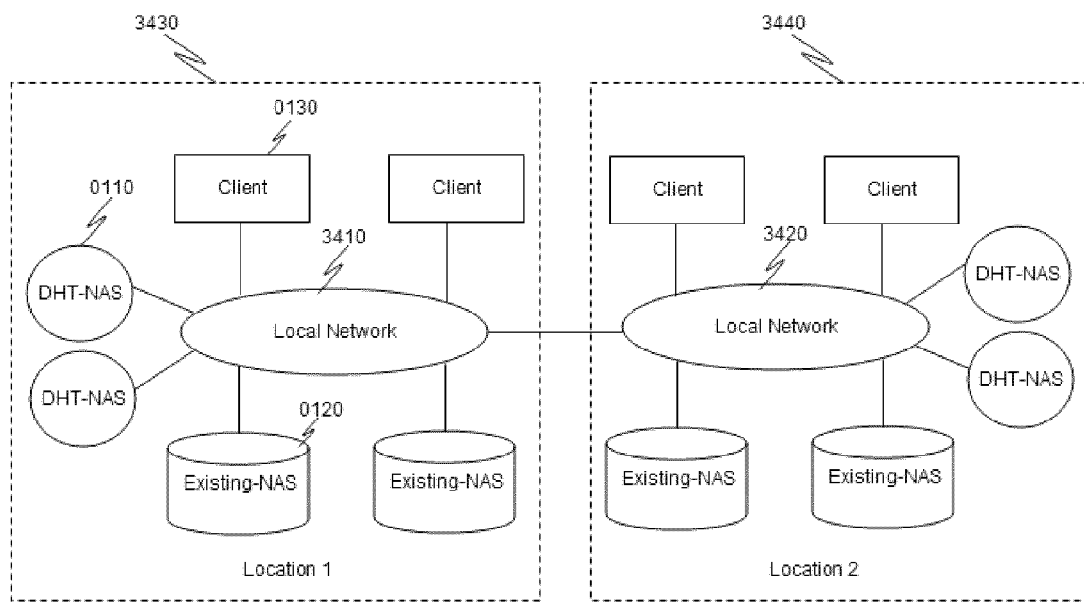
FIG. 34 shows an example of an overall system according to a third embodiment, in which NAS devices and clients are distributed at different locations.

FIG. 34 shows an example of an overall system according to the third embodiment, in which NAS devices 0110, 0120 and clients 0130 are distributed at different locations 3430, 3440. At each location, there is a local network 3410, 3420 where the NAS devices 0110, 0120 and clients 0130 at the location are connected. It should be noted that NAS devices can be geographically located at more than two locations. The example shown in FIG. 34 is for simplicity of explanation.

Figures 35, 36:
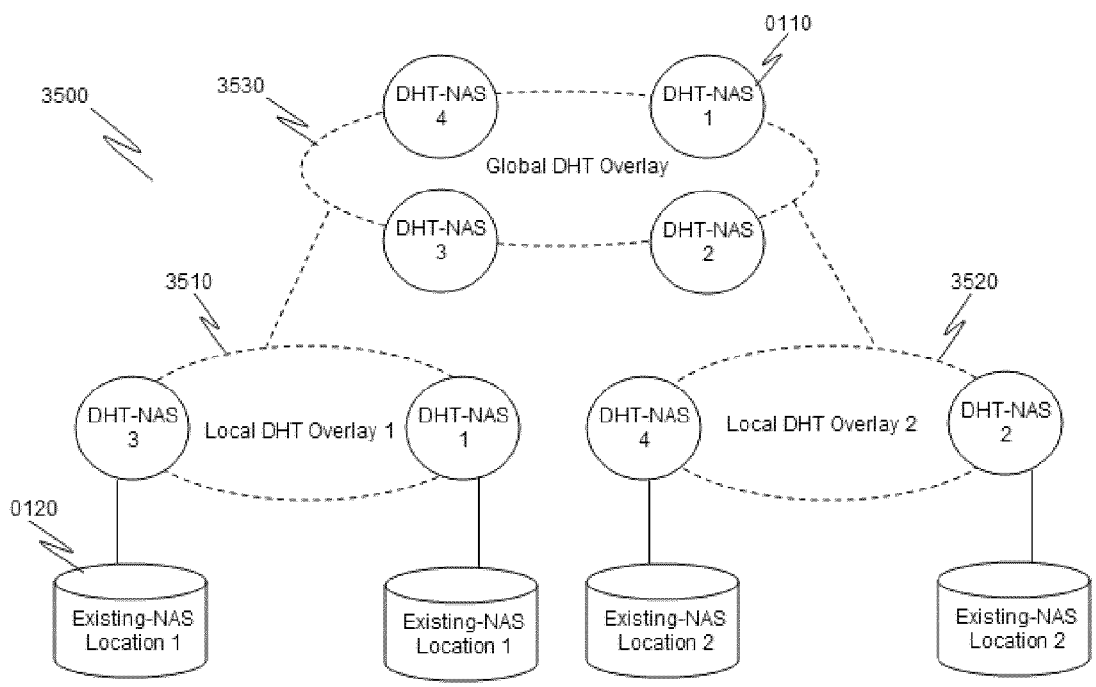
FIG. 35 shows an example of a hierarchical DHT overlay constructed for the system of the third embodiment.
FIG. 36 shows an example of the information of Existing-NAS devices gathered in the Existing-NAS information table during the initial phase according to the third embodiment.

Similar to the second embodiment, during the DHT overlay construction phase (Step 0810), a hierarchical DHT overlay 3500 is constructed as shown in FIG. 35. A Local DHT overlay 3510, 3520 is constructed for each location to virtualize the Existing-NAS devices 0120 at the location. There is also a global DHT overlay 3530, involving all the DHT-NAS devices 0110 in the system. A DHT-NAS device 0110 belongs to only one Local DHT overlay and the global DHT overlay 3530.

FIG. 36 shows the information of Existing-NAS devices 0120 gathered in the Existing-NAS information table 0323, including the location information 3610, during the Initial Phase (Step 0820). The location information 3610 is then included in the (key, value) pairs generated in the Initial Phase (Step 1030) and the Discovery Phase (Step 1740), by the Key-Value pair generation program 0326. As a result, the location information 3610 is stored in the key lookup table 0321 of a DHT-NAS device 0110, as shown in FIG. 37. The location of NAS 3710 indicates the location to which the NAS holding the GNS entry belongs.

During the Working Phase (Step 0840), when receiving a GNS request to migrate a file, a DHT-NAS device 0110 extracts the destination location information 3610 from the request and sends the request to the responsible DHT-NAS device 0110 in the specific local DHT overlay 3510 or 3520. The responsible DHT-NAS device 0110 then checks whether the parent GNS path entry is also stored in the same local DHT overlay. If YES and the type of the parent GNS path entry is "NAS", the file is stored in the Existing-NAS device 0120 hosting the parent GNS entry. Otherwise, the file is stored in the responsible DHT-NAS device 0110 in the specific local DHT overlay.

Similarly, when receiving a GNS request to create a new file, a DHT-NAS device 0110 extracts the destination location information 3610 from the request, and sends the request to the responsible DHT-NAS device 0110 in the specific local DHT overlay. The responsible DHT-NAS device 0110 then checks whether the parent GNS path entry is also stored in the same local DHT overlay. If YES and the type of the parent GNS path entry is "NAS", the file is then created in the Existing-NAS device 0120 hosting the parent GNS entry. Otherwise, the file is created in the responsible DHT-NAS device 0110 in the specific local DHT overlay.

Therefore, with the third embodiment, it is easier for a client 0130 to migrate a file from one location to another, or create a file at a specific location, by simply providing the destination location information 3610.

It should be noted that the second and third embodiments can be combined together to provide a GNS across different tiers of geographically distributed NAS devices, by storing both the tier information 3210 and location information 3610 in the key lookup table 0321.

While the invention has been described in terms of its preferred embodiments, numerous modifications may be made without departing from the spirit and scope of the present invention. It is intended that all such modifications fall within the scope of the appended claims.

We claim:

1. A method of constructing a distributed hash table (DHT)-based global namespace (GNS) for a network system including a plurality of network attached storage (NAS) devices connected to each other by a network, the NAS devices including at least one DHT-NAS device defined as a NAS device having DHT functionalities, and at least one Existing-NAS device defined as a NAS device that does not have DHT functionalities; the method comprising the steps of:

in a DHT overlay construction phase, constructing by each DHT-NAS device a DHT overlay of the DHT-NAS devices, in an initial phase, the following steps performed by a processor of the DHT-NAS device executing a namespace initialization program:

gathering information of the Existing-NAS devices, including IP addresses, share folders, and free storage capacity thereof, into an Existing-NAS information table;

creating a GNS hierarchical namespace above the share folders based on the information gathered in the Existing-NAS information table;

executing a key-value pair generation program, generating a (key, value) pair for each GNS path in the GNS hierarchical namespace, wherein the key is the hash value of the GNS path generated by invoking a hashing program, and wherein the value is generated with metadata information of the GNS path including the GNS path entry, the type of device in which the GNS path is stored, the IP address of the corresponding Existing-NAS device, and the path within the share folder; and storing the (key, value) pairs to a key lookup table in the corresponding DHT-NAS devices through the DHT overlay;

in a discovery phase, the following steps performed by the processor of the DHT-NAS device executing a namespace discovery program:

discovering the Existing-NAS devices identified in the key lookup table, and creating the GNS hierarchical namespace under the share folders; and in a working phase, the following steps performed by the processor of the DHT-NAS device executing a request processing program:

checking whether a directory or file request to the GNS namespace has been received, and responding to the request if a directory or file request to the GNS namespace has been received.

2. The method of constructing a DHT-based global namespace according to claim 1, wherein during the DHT overlay construction phase, the DHT-NAS device:

constructs a hierarchical DHT overlay, including a first tier DHT overlay and a second tier DHT overlay that virtualize first tier Existing-NAS devices and second tier Existing-NAS devices, respectively; and constructs a global DHT overlay involving the DHT-NAS devices, wherein each DHT-NAS device belongs to only one of the first and second tier DHT overlays and to the Global DHT overlay;

wherein in the initial phase, the information gathered into the Existing-NAS information table by the processor of the DHT-NAS device executing the namespace initialization program includes tier information of the Existing-NAS devices, wherein the tier information indicates the tier to which the Existing-NAS device holding the GNS entry belongs; the tier information is included in the (key, value) pairs generated when executing the key-value pair generation program; and the tier information is stored to the key lookup table in the corresponding DHT-NAS device through the DHT overlay.

3. The method of constructing a DHT-based global namespace according to claim 1, wherein the DHT-NAS devices and Existing-NAS devices are located at different locations to comprise plural local networks, wherein during the DHT overlay construction phase, the hierarchical DHT overlay is constructed such that a Local DHT overlay is constructed for each of the different locations to virtualize the Existing-NAS devices thereat; and such that a global DHT overlay involving the DHT-NAS devices at the different locations is constructed, wherein each DHT-NAS device belongs to only one Local DHT overlay and to the global DHT overlay;

wherein in the initial phase, the information gathered into the Existing-NAS information table by the processor of the DHT-NAS device executing the namespace initialization program includes the location information of the Existing-NAS devices, wherein the location information indicates the location to which the NAS holding the GNS entry belongs; wherein the location information is included in the (key, value) pairs generated by the key-value pair generation program, and the location information is stored in the key lookup table of the DHT-NAS device.

4. The method of constructing a DHT-based global namespace according to claim 1, wherein the DHT overlay construction phase further includes the steps, performed by the processor of the DHT-NAS device executing a DHT routing program, of:

executing the DHT routing program in one of the DHT-NAS devices, wherein the executed DHT routing program invokes the hashing program;

obtaining a node identifier of the DHT-NAS device executing the DHT routing program by the hashing program calculating a hash value of its IP address;

checking whether the DHT-NAS device is a first DHT-NAS device in the system;

if the DHT-NAS device is the first DHT-NAS device in the system, constructing the DHT overlay, with itself as the single DHT-NAS device; and if the DHT-NAS device is not the first DHT-NAS device in the system, sending a join request to an existing DHT-NAS device in the system to join a DHT overlay therewith by following a DHT routing protocol implemented in the DHT routing program.

5. The method of constructing a DHT-based global namespace according to claim 1, wherein the discovery phase further includes:

for a NAS-type GNS path type entry in the key lookup table, discovering the directories and files under the GNS path within the share folder of the corresponding Existing-NAS device at the IP address thereof identified in the key lookup table;

checking whether any directory or file is discovered;

for each directory or file found, creating a GNS path by combining the GNS path information of the parent directory;

executing the key-value generation program, generating the (key, value) pair for the created GNS path entry, wherein the key is the hash value of the created GNS path generated by invoking the hashing program, and the value is generated with the metadata information of the GNS path including the GNS path entry, the type of device in which the GNS path is stored, the IP address of the corresponding Existing-NAS device, and the path within the share folder of the corresponding Existing-NAS device;

storing the (key, value) pair to the key lookup tables in the corresponding DHT-NAS devices through the DHT overlay; and repeating the checking, creating, generating, and storing steps until no more directory/file is discovered.

6. The method of constructing a DHT-based global namespace according to claim 1, wherein the working phase further includes:

if a directory or file request to the GNS namespace is not received, the DHT-NAS device repeats the checking step;

if a directory or file request to the GNS namespace is received, extracting the GNS path of the requested directory or file from the request;

calculating the key of the GNS path by executing the hashing program;

checking whether the key belongs to an ID range for which the DHT-NAS is responsible:

if the key does not belong to an ID range for which the DHT-NAS is responsible, looking up a DHT routing table in the DHT-NAS to find another DHT-NAS device in the system having a Node ID that is next numerically closer in the ID space to the key;

sending the request to the DHT-NAS device found in the DHT routing table; and remaining in the working phase to serve other requests; and if the key belongs to an ID range for which the DHT-NAS is responsible;

processing the request, and remaining in the working phase to serve other requests.

7. The method of constructing a DHT-based global namespace according to claim 6, wherein the step of processing the request includes:

checking whether the request is to read an existing GNS namespace, to create a new GNS path entry, or to migrate a file/directory from one NAS device to another;

if the result of the checking step is that the request is to read an existing GNS namespace, a read-request process is invoked which is performed by the processor and includes:

searching the key lookup table to look up an entry corresponding to a requested key;

checking whether the requested key is found in the key lookup table;

if the requested key is found in the key lookup table, retrieving the requested file or directory from the location recorded in the key lookup table; and returning the retrieved file or directory to the DHT-NAS device issuing the request; and if the requested key is not found in the key lookup table, returning a message that shows no file to the DHT-NAS device issuing the request.

8. The method of constructing a DHT-based global namespace according to claim 7, wherein if the result of the checking step is that the request is to create a new GNS path entry, a create-request process is invoked which is performed by the processor and includes:

extracting the GNS path of the parent directory of the requested file/directory, calculating the key of the parent GNS path by executing the hashing program;

retrieving the (key, value) pair of the parent directory from the responsible DHT-NAS device through the DHT overlay;

checking whether the type of the device hosting the parent directory is "P2P" or "NAS";

if the type is "NAS", a new directory/file is created under the parent directory in the Existing-NAS device holding the parent directory; and if the type is "P2P", a new directory/file is created in a local share folder in the DHT-NAS device;

updating the parent directory to include the newly-created directory/file; and inserting the GNS metadata information of the newly-created directory/file into the key lookup table.

9. The method of constructing a DHT-based global namespace according to claim 8, wherein if the result of the checking step is that the request is to migrate a file/directory from one NAS device to another, a migrate-request process is invoked which is performed by the processor and includes:

extracting a migration destination and the GNS path of the parent directory;

calculating the key of the parent GNS path by executing the hashing program;

retrieving the (key, value) pair of the parent directory from the responsible DHT-NAS device through the DHT overlay;

retrieving the directory/file to be migrated from the location recorded in the key lookup table;

checking whether the location of the parent directory is at the migration destination;

if the location of the parent directory is not at the migration destination, storing the directory/file to the destination; and if the location of the parent directory is at the migration destination, checking whether the type of the device hosting the parent directory is "P2P" or "NAS";

if the type is "P2P", storing the directory/file to the destination; and if the type is "NAS", storing the directory/file to the destination under the GNS parent directory; and updating the location of the migrated directory/file in the key lookup table to the real location in the destination NAS device.

10. The method of constructing a DHT-based global namespace according to claim 9, wherein during the DHT overlay construction phase, the DHT-NAS device:

constructs a hierarchical DHT overlay, including a first tier DHT overlay and a second tier DHT overlay that virtualize first tier Existing-NAS devices and second tier Existing-NAS devices, respectively; and constructs a global DHT overlay involving the DHT-NAS devices, wherein each DHT-NAS device belongs to only one of the first and second tier DHT overlays and to the Global DHT overlay;

wherein in the initial phase, the information gathered into the Existing-NAS information table by the processor of the DHT-NAS device executing the namespace initialization program includes tier information of the Existing-NAS devices, wherein the tier information indicates the tier to which the Existing-NAS device holding the GNS entry belongs; the tier information is included in the (key, value) pairs generated when executing the key-value pair generation program; and the tier information is stored to the key lookup table in the corresponding DHT-NAS device through the DHT overlay;

wherein in the discovery phase, the tier information is included in the (key, value) pair generated for the created GNS path entry when executing the key-value pair generation program, and wherein the tier information is included in the (key, value) pair stored to the key lookup tables in the corresponding DHT-NAS devices through the DHT overlay;

wherein when receiving the request to migrate a file, the DHT-NAS device extracts destination tier information from the request and sends the request to the responsible DHT-NAS device in the tier DHT overlay to which the responsible DHT-NAS belongs; and wherein the responsible DHT-NAS device checks whether the parent GNS path entry is also stored in the tier DHT overlay to which the responsible DHT-NAS belongs, and if the parent GNS path entry is also stored in the tier DHT overlay to which the responsible DHT-NAS belongs and the type of the parent GNS path entry is "NAS", the file is stored in the Existing-NAS device hosting the parent GNS entry; if the parent GNS path entry is not stored in the tier DHT overlay to which the responsible DHT-NAS belongs or the type of the parent GNS path entry is not "NAS", the file is stored in the responsible DHT-NAS device in the tier DHT overlay to which the responsible DHT-NAS belongs.

11. The method of constructing a DHT-based global namespace according to claim 9,
wherein the DHT-NAS devices and Existing-NAS devices are located at different locations to comprise plural local networks,
wherein during the DHT overlay construction phase, the hierarchical DHT overlay is constructed such that a Local DHT overlay is constructed for each of the different locations to virtualize the Existing-NAS devices thereat; and such that a global DHT overlay involving the DHT-NAS devices at the different locations is constructed, wherein each DHT-NAS device belongs to only one Local DHT overlay and to the global DHT overlay;
wherein in the initial phase, the information gathered into the Existing-NAS information table by the processor of the DHT-NAS device executing the namespace initialization program includes the location information of the Existing-NAS devices, wherein the location information indicates the location to which the NAS holding the GNS entry belongs; wherein the location information is included in the (key, value) pairs generated by the key-value pair generation program, and the location information is stored in the key lookup table of the DHT-NAS device;
wherein in the discovery phase, the location information is included in the (key, value) pair generated for the created GNS path entry when executing the key-value pair generation program, and wherein the location information is included in the (key, value) pair stored to the key lookup tables in the corresponding DHT-NAS devices through the DHT overlay;
wherein when receiving the request to migrate a file or to create a new file, the DHT-NAS device extracts destination location information from the request and sends the request to the responsible DHT-NAS device in the local DHT overlay to which the responsible DHT-NAS belongs; and
wherein the responsible DHT-NAS device checks whether the parent GNS path entry is also stored in the local DHT overlay to which the responsible DHT-NAS belongs, and if the parent GNS path entry is also stored in the local DHT overlay to which the responsible DHT-NAS belongs and the type of the parent GNS path entry is "NAS", the file is stored in the Existing-NAS device hosting the parent GNS entry; if the parent GNS path entry is not stored in the local DHT overlay to which the responsible DHT-NAS belongs or the type of the parent GNS path entry is not "NAS", the file is stored in the responsible DHT-NAS device in the local DHT overlay to which the responsible DHT-NAS belongs.

12. A network system having a distributed hash table (DHT)-based global namespace (GNS), comprising:
a plurality of NAS devices connected to each other by a network, the NAS devices including at least one DHT-NAS device defined as a NAS device having DHT functionalities, and at least one Existing-NAS device defined as a NAS device that does not have DHT functionalities;
wherein each DHT-NAS device includes:
a processor;
a network interface via which the DHT-NAS device is coupled to the network;
a NFS/CIFS protocol module;
a storage management module;
a storage interface arranged to receive and transmit block level data access from the storage management module to a storage and to receive and transmit a response from the storage to the storage management module,
wherein the storage management module is arranged to organize the storage provided by the storage interface into shared storage for user files and free storage,
a system memory; and
a system bus via which the processor is coupled to each of the network interface, the NFS/CIFS protocol module; the storage management module, the storage interface, and the system memory;
wherein the system memory holds a key lookup table, a DHT routing table, an Existing-NAS information table, a DHT routing program, a hashing program, a key-value pair generation program, a namespace initialization program, a namespace discovery program, and a request processing program;
wherein each Existing-NAS device includes:
a network interface via which the Existing-NAS device is coupled to the network;
a NFS/CIFS protocol module;
a storage interface; and
a storage management module arranged to organize a storage provided by the storage interface into shared storage for user files and free storage, wherein the storage interface of the Existing-NAS provides a logical storage volume to the storage management module;
wherein the processor executes the DHT routing program, stored in the system memory, to construct a DHT overlay of the DHT-NAS device in a DHT overlay construction phase;
the processor executes the namespace initialization program to perform the following in an initial phase:
gathering information of the Existing-NAS devices, including IP addresses, share folders, and free storage capacity thereof, into the Existing-NAS information table;
creating a GNS hierarchical namespace above the share folders based on the information gathered in the Existing-NAS information table;
executing the key-value pair generation program, generating a (key, value) pair for each GNS path in the GNS hierarchical namespace, wherein the key is the hash value of the GNS path generated by invoking the hashing program, and wherein the value is generated with metadata information of the GNS path including the GNS path entry, the type of device in which the GNS path is stored, the IP address of the corresponding Existing-NAS device, and the path within the share folder; and
storing the (key, value) pairs to the key lookup table in corresponding DHT-NAS devices through the DHT overlay;
the processor executes the namespace discovery program to perform the following in a discovery phase:
discovering the Existing-NAS devices identified in the key lookup table, and
creating the GNS hierarchical namespace under the share folders; and
the processor executes the request processing program to perform the following in a working phase:
checking whether a directory or file request to the GNS namespace has been received, and responding to the request if a directory or file request to the GNS namespace has been received wherein each storage management module includes at least one of software and circuitry.

13. The network system according to claim 12, wherein during the DHT overlay construction phase, the DHT-NAS device:
   constructs a hierarchical DHT overlay, including a first tier DHT overlay and a second tier DHT overlay that virtualize first tier Existing-NAS devices and second tier Existing-NAS devices, respectively; and
   constructs a global DHT overlay involving the DHT-NAS devices, wherein each DHT-NAS device belongs to only one of the first and second tiers Tier DHT overlay and to the Global DHT overlay;
   wherein in the initial phase, the information gathered into the Existing-NAS information table by the processor of the DHT-NAS device executing the namespace initialization program includes tier information of the Existing-NAS devices, wherein the tier information indicates the tier to which the Existing-NAS device holding the GNS entry belongs; the tier information is included in the (key, value) pairs generated when executing the key-value pair generation program; and the tier information is stored to the key lookup table in the corresponding DHT-NAS device through the DHT overlay.

14. The network system according to claim 12,
   wherein the DHT-NAS devices and Existing-NAS devices are located at different locations to comprise plural local networks,
   wherein during the DHT overlay construction phase, the hierarchical DHT overlay is constructed such that a Local DHT overlay is constructed for each of the different locations to virtualize the Existing-NAS devices thereat; and such that a global DHT overlay involving the DHT-NAS devices at the different locations is constructed, wherein each DHT-NAS device belongs to only one Local DHT overlay and to the global DHT overlay;
   wherein in the initial phase, the information gathered into the Existing-NAS information table by the processor of the DHT-NAS device executing the namespace initialization program includes the location information of the Existing-NAS devices, wherein the location information indicates the location to which the NAS holding the GNS entry belongs; wherein the location information is included in the (key, value) pairs generated by the key-value pair generation program, and the location information is stored in the key lookup table of the DHT-NAS device.

15. The network system according to claim 12, wherein the DHT overlay construction phase includes the steps, performed by the processor of the DHT-NAS device executing the DHT routing program, of:
   obtaining a node identifier of the DHT-NAS device executing the DHT routing program by the hashing program calculating a hash value of its IP address;
   checking whether the DHT-NAS device is a first DHT-NAS device in the system;
   if the DHT-NAS device is the first DHT-NAS device in the system, constructing the DHT overlay, with itself as the single DHT-NAS device; and
   if the DHT-NAS device is not the first DHT-NAS device in the system, sending a join request to an existing DHT-NAS device in the system to join the DHT overlay therewith by following a DHT routing protocol implemented in the DHT routing program.

16. The network system according to claim 12, wherein the discovery phase further includes:
   for a NAS-type GNS path type entry in the key lookup table, discovering the directories and files under the GNS path within the share folder of the corresponding Existing-NAS device at the IP address thereof identified in the key lookup table;
   checking whether any directory or file is discovered;
   for each directory or file found, creating a GNS path by combining the GNS path information of the parent directory;
   executing the key-value generation program, generating a (key, value) pair for the created GNS path entry, wherein the key is the hash value of the created GNS path generated by invoking the hashing program, and the value is generated with the metadata information of the GNS path including the GNS path entry, the type of device in which the GNS path is stored, the IP address of the corresponding Existing-NAS device, and the path within the share folder of the corresponding Existing-NAS device;
   storing the (key, value) pair to the key lookup tables in the corresponding DHT-NAS devices through the DHT overlay; and
   repeating the checking, creating, generating, and storing steps until no more directory/file is discovered.

17. The network system according to claim 12, wherein the working phase further includes:
   if a directory or file request to the GNS namespace is not received, the DHT-NAS device repeats the checking step;
   if a directory or file request to the GNS namespace is received,
      extracting the GNS path of the requested directory or file from the request;
      calculating the key of the GNS path by executing the hashing program;
      checking whether the key belongs to an ID range for which the DHT-NAS is responsible:
      if the key does not belong to an ID range for which the DHT-NAS is responsible,
         looking up a DHT routing table in the system memory to find another DHT-NAS device in the system having a Node ID that is next numerically closer in the ID space to the key;
         sending the request to the DHT-NAS device found in the DHT routing table; and
         remaining in the working phase to serve other requests; and
      if the key belongs to an ID range for which the DHT-NAS is responsible;
         processing the request, and
         remaining in the working phase to serve other requests.

18. The network system according to claim 17, wherein the step of processing the request includes:
   checking whether the request is to read an existing GNS namespace, to create a new GNS path entry, or to migrate a file/directory from one NAS device to another;
   if the result of the checking step is that the request is to read an existing GNS namespace, a read-request process is invoked which is performed by the processor and includes:
      searching the key lookup table to look up an entry corresponding to a requested key;
      checking whether the requested key is found in the key lookup table;
      if the requested key is found in the key lookup table, retrieving the requested file or directory from the location recorded in the key lookup table; and
returning the retrieved file or directory to the DHT-NAS device issuing the request; and
if the requested key is not found in the key lookup table, returning a message that shows no file to the DHT-NAS device issuing the request.

19. The network system according to claim 18, wherein if the result of the checking step is that the request is to create a new GNS path entry, a create-request process is invoked which is performed by the processor and includes:
extracting the GNS path of the parent directory of the requested file/directory,
calculating the key of the parent GNS path by executing the hashing program;
retrieving the (key, value) pair of the parent directory from the responsible DHT-NAS device through the DHT overlay;
checking whether the type of the device hosting the parent directory is "P2P" or "NAS";
if the type is "NAS", a new directory/file is created under the parent directory in the Existing-NAS device holding the parent directory; and
if the type is "P2P", a new directory/file is created in a local share folder in the DHT-NAS device;
updating the parent directory to include the newly-created directory/file; and
inserting the GNS metadata information of the newly-created directory/file into the key lookup table.

20. The network system according to claim 19, wherein if the result of the checking step is that the request is to migrate a file/directory from one NAS device to another, a migrate-request process is invoked which is performed by the processor and includes:
extracting a migration destination and the GNS path of the parent directory;
calculating the key of the parent GNS path by executing the hashing program;
retrieving the (key, value) pair of the parent directory from the responsible DHT-NAS device through the DHT overlay;
retrieving the directory/file to be migrated from the location recorded in the key lookup table;
checking whether the location of the parent directory is at the migration destination;
if the location of the parent directory is not at the migration destination, storing the directory/file to the destination; and
if the location of the parent directory is at the migration destination, checking whether the type of the device hosting the parent directory is "P2P" or "NAS";
if the type is "P2P", storing the directory/file to the destination; and
if the type is "NAS", storing the directory/file to the destination under the GNS parent directory; and
updating the location of the migrated directory/file in the key lookup table to the real location in the destination NAS device.

21. The network system according to claim 20,
wherein during the DHT overlay construction phase, the DHT-NAS device:
constructs a hierarchical DHT overlay, including a first tier DHT overlay and a second tier DHT overlay that virtualize first tier Existing-NAS devices and second tier Existing-NAS devices, respectively; and
constructs a global DHT overlay involving the DHT-NAS devices, wherein each DHT-NAS device belongs to only one of the first and second tiers Tier DHT overlay and to the Global DHT overlay;
wherein in the initial phase, the information gathered into the Existing-NAS information table by the processor of the DHT-NAS device executing the namespace initialization program includes tier information of the Existing-NAS devices, wherein the tier information indicates the tier to which the Existing-NAS device holding the GNS entry belongs; the tier information is included in the (key, value) pairs generated when executing the key-value pair generation program; and the tier information is stored to the key lookup table in the corresponding DHT-NAS device through the DHT overlay wherein in the discovery phase, the tier information is included in the (key, value) pair generated for the created GNS path entry when executing the key-value pair generation program, and wherein the tier information is included in the (key, value) pair stored to the key lookup tables in the corresponding DHT-NAS devices through the DHT overlay;
wherein when receiving the request to migrate a file, the DHT-NAS device extracts destination tier information from the request and sends the request to the responsible DHT-NAS device in the tier DHT overlay to which the responsible DHT-NAS belongs; and
wherein the responsible DHT-NAS device checks whether the parent GNS path entry is also stored in the tier DHT overlay to which the responsible DHT-NAS belongs, and if the parent GNS path entry is also stored in the tier DHT overlay to which the responsible DHT-NAS belongs and the type of the parent GNS path entry is "NAS", the file is stored in the Existing-NAS device hosting the parent GNS entry; if the parent GNS path entry is not stored in the tier DHT overlay to which the responsible DHT-NAS belongs or the type of the parent GNS path entry is not "NAS", the file is stored in the responsible DHT-NAS device in the tier DHT overlay to which the responsible DHT-NAS belongs.

22. The network system according to claim 20,
wherein the DHT-NAS devices and Existing-NAS devices are located at different locations to comprise plural local networks,
wherein during the DHT overlay construction phase, the hierarchical DHT overlay is constructed such that a Local DHT overlay is constructed for each of the different locations to virtualize the Existing-NAS devices thereat; and such that a global DHT overlay involving the DHT-NAS devices at the different locations is constructed, wherein each DHT-NAS device belongs to only one Local DHT overlay and to the global DHT overlay;
wherein in the initial phase, the information gathered into the Existing-NAS information table by the processor of the DHT-NAS device executing the namespace initialization program includes the location information of the Existing-NAS devices, wherein the location information indicates the location to which the NAS holding the GNS entry belongs; wherein the location information is included in the (key, value) pairs generated by the key-value pair generation program, and the location information is stored in the key lookup table of the DHT-NAS device; and
wherein in the discovery phase, the location information is included in the (key, value) pair generated for the created GNS path entry when executing the key-value pair generation program, and wherein the location information is included in the (key, value) pair stored to the key lookup tables in the corresponding DHT-NAS devices through the DHT overlay;

wherein when receiving the request to migrate a file or create a new file, the DHT-NAS device extracts destination location information from the request and sends the request to the responsible DHT-NAS device in the local DHT overlay to which the responsible DHT-NAS belongs; and wherein the responsible DHT-NAS device checks whether the parent GNS path entry is also stored in the local DHT overlay to which the responsible DHT-NAS belongs, and if the parent GNS path entry is also stored in the local DHT overlay to which the responsible DHT-NAS belongs and the type of the parent GNS path entry is "NAS", the file is stored in the Existing-NAS device hosting the parent GNS entry; if the parent GNS path entry is not stored in the local DHT overlay to which the responsible DHT-NAS belongs or the type of the parent GNS path entry is not "NAS", the file is stored in the responsible DHT-NAS device in the local DHT overlay to which the responsible DHT-NAS belongs.

* * * * *